(12) United States Patent
Uchida

(10) Patent No.: US 8,239,634 B2
(45) Date of Patent: Aug. 7, 2012

(54) INPUT/OUTPUT CONTROL BASED ON INFORMATION SPECIFYING INPUT/OUTPUT ISSUING SOURCE AND INPUT/OUTPUT PRIORITY

(75) Inventor: Satoshi Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 269 days.

(21) Appl. No.: 12/663,201

(22) PCT Filed: May 19, 2008

(86) PCT No.: PCT/JP2008/059119
§ 371 (c)(1),
(2), (4) Date: Dec. 4, 2009

(87) PCT Pub. No.: WO2008/149657
PCT Pub. Date: Dec. 11, 2008

(65) Prior Publication Data
US 2010/0174871 A1 Jul. 8, 2010

(30) Foreign Application Priority Data
Jun. 5, 2007 (JP) .................................. 2007-149489

(51) Int. Cl.
*G06F 12/06* (2006.01)
(52) U.S. Cl. .................................. 711/143; 711/E12.04
(58) Field of Classification Search .................. 711/143, 711/E12.04
See application file for complete search history.

(56) References Cited

U.S. PATENT DOCUMENTS

| | | | | |
|---|---|---|---|---|
| 7,000,072 B1 * | 2/2006 | Aisaka et al. | ................. | 711/118 |
| 7,062,609 B1 * | 6/2006 | Trehus et al. | ................. | 711/141 |
| 2005/0223168 A1 * | 10/2005 | Ohmura | ................. | 711/113 |
| 2006/0146852 A1 * | 7/2006 | Munagala et al. | ............ | 370/419 |
| 2006/0179250 A1 * | 8/2006 | Guthrie et al. | ................. | 711/143 |
| 2006/0206752 A1 * | 9/2006 | Ikeuchi et al. | ..................... | 714/6 |
| 2008/0005478 A1 * | 1/2008 | Lubbers et al. | ................. | 711/135 |
| 2008/0065718 A1 * | 3/2008 | Todd et al. | ..................... | 709/203 |

(Continued)

FOREIGN PATENT DOCUMENTS

JP 3-265958 A 11/1991

(Continued)

OTHER PUBLICATIONS

International Search Report for PCT/JP2008/059119 mailed Aug. 12, 2008.

(Continued)

*Primary Examiner* — Hal Schnee

(57) ABSTRACT

An input/output control system of an information processing apparatus that includes a first storage area and a second storage area and carries out an input/output processing using a part or whole of the first storage area as a cache. The input/output control system includes: a cache managing unit 110 storing data, which is inputted from or outputted to the second storage area, in a third storage area used as a cache of the first storage area; an input/output specification information storage unit 111 correlating a data area, which is an area of the data stored in the third storage area, and information with regard to the input/output to store them; a write-back unit 120 generating an output request of the data from the data area in the third storage area to the second storage area; and an input/output specifying unit 100 specifying the information with regard to the input/output correlated to the data area of the data which is a target for the generated output request, by referring to the input/output specification information storage unit.

37 Claims, 21 Drawing Sheets

U.S. PATENT DOCUMENTS

2008/0177952 A1* 7/2008 Morrow .................. 711/133

FOREIGN PATENT DOCUMENTS

| | | |
|---|---|---|
| JP | 5-128002 A | 5/1993 |
| JP | 8-95896 A | 4/1996 |
| JP | 8-328956 A | 12/1996 |
| JP | 11-265262 A | 9/1999 |
| JP | 2000172562 | 6/2000 |
| JP | 2005293205 A | 10/2005 |
| JP | 2006350780 A | 12/2006 |
| JP | 2007094995 A | 4/2007 |
| WO | 9940516 A | 8/1999 |

OTHER PUBLICATIONS

D. P. Bovet et al., "Understanding the LINUX KERNEL", O'Reilly Media, Inc., Nov. 2005, pp. 580-583, 622-629.

International Preliminary Report on Patentability for PCT/JP2008/059119 mailed Oct. 13, 2011.

\* cited by examiner

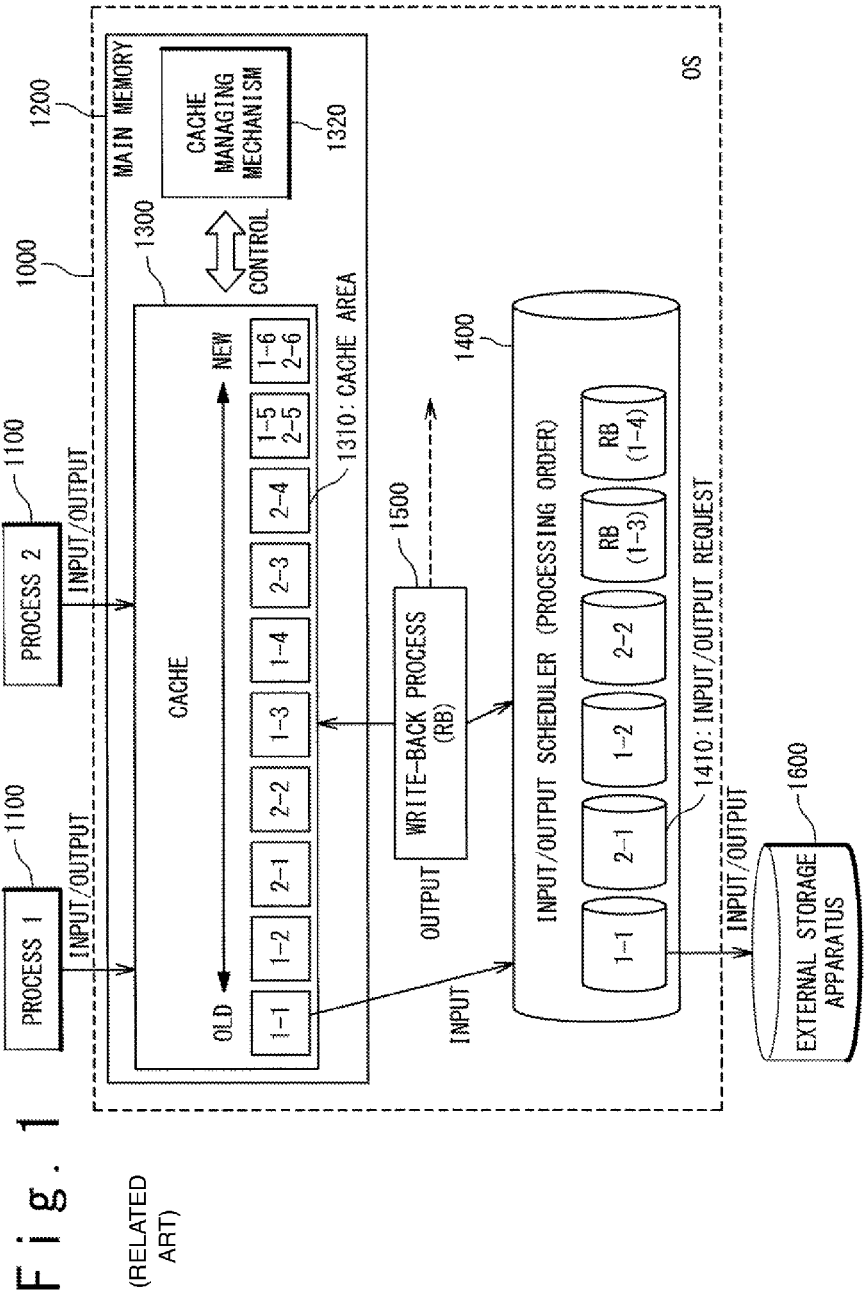

INPUT/OUTPUT CONTROL BASED ON INFORMATION SPECIFYING INPUT/OUTPUT ISSUING SOURCE AND INPUT/OUTPUT PRIORITY

This application is the National Phase of PCT/JP2008/059119, filed May 19, 2008, which is based upon and claims the benefit of priority from Japanese patent application No. 2007-149489 filed on Jun. 5, 2007, the disclosure of which is incorporated herein in its entirety by reference.

TECHNICAL FIELD

The present invention relates to an input/output control system, an input/output control method, and an input/output control program for a computer. More particularly, the present invention relates to an input/output control system, an input/output control method and an input/output control program, which are used by a computer that accesses an external storage apparatus using a cache.

BACKGROUND ART

In a current computer, a computer service is attained by installing programs and data into a main memory, and executing a data-processing while carrying out data input/output from/to an external storage apparatus such as a hard disk. Here, the program describes an operating procedure by using commands with a format operable in the computer. Actually, a plurality of processings is operated by using the same program. That is, a plurality of operations is carried out along the same procedure. A unit at which they are processed along this program is referred to as a process.

The program for controlling the operations of the computer is an operating system (OS). On the OS, many processes are operated to input/output the data from/to the external storage apparatus. Here, in order to operate the process, the processing of reading the program body from the external storage apparatus to the main memory is also the input of the data referred to as the program body from the external storage apparatus, and also a part of the data input/output from/to the external storage apparatus.

The input/output processing of the data has great influence on the responsibility of the process. The responsibility of the process implies the performance until some kind of a result or response is replied, when a request is inputted from the process and then the processing in response to the request is carried out. For example, in a case of a reading process of a word processor software, the responsibility of the process is the time until a document file is opened. In a case of an input process, it is the time until one character is input-processed and displayed after key input.

Also, as another example, in a case of a page access in the Internet, the responsibility of the process is the responsibility of an access process from the viewpoint of a user, and is a time until a corresponding page is displayed on a web browser after the input of an URL. However, from the viewpoint of the web browser, the page access is the access to a plurality of files or documents, and it is configured from a request of "accessing each file or document" and a result of "completing a reception of transferred data corresponding to the request". Thus, the page access is composed of a plurality of responses.

In this way, the responsibility of the process exists at various granularities.

There is a case that the data input/output requires the input/output from/to the external storage apparatus. Its input/output requires a long time, as compared with a case that the computer uses a processing unit and a main memory to carry out a calculation processing. For this reason, the input/output processing of the data tends to be dominant in a process execution, and this has great influence on the responsibility. Thus, in order to improve the responsibility of one process, the input/output processing of the data, namely, a data transfer speed to the external storage apparatus, the storage speed and the like are required to be improved.

Usually, as the continuous data are inputted or outputted in a burst mode from or to the external storage apparatus, the transfer speed is improved. This is because an overhead such as a seek time of a hard disk can be reduced and a bus can be fully used when the data are transferred. However, when one process inputs/outputs the vast quantity of the data at a time and prioritizes the data input/output, another process cannot carry out the input/output and then proceeds to a waiting state, and the processing is interrupted. As a result, the responsibility of the other process is decreased, which brings about a problem that the entire average responsibility is decreased. For this reason, the OS has an input/output scheduler, and while adjusting the tradeoff between the attainment of the faster speed resulting from the continuous data input/output and the responsibility improvement to each process, carries out the input/output control.

For example, "I/O Scheduling Algorithms", which is written by DANIEL P. BOVET, MARCO CESATI, Understanding the LINUX KERNEL, U.S., O'REILLY, November 2005, Pages 580 to 583 discloses an input/output scheduling mechanism of the Linux. That is, the Linux has the input/output scheduling mechanism referred to as the I/O elevator and can set the Noop scheduler, the Deadline scheduler, the Anticipatory scheduler, the CFQ (Complete Fairness Queueing) scheduler and the like, on the basis of a difference of application.

The input/output scheduler carries out an ability distribution based on a priority, for an input/output request, at a step of carrying out an input/output control. At this time, as parameters to determine the priority of the input/output, for example, there are an ID of a process group and an ID of a process, and a priority of an input/output set for its process, and an identifier of an external storage apparatus of an input/output destination, and the like.

For an input/output request, with reference to the process ID, the input/output scheduler, for example, uniformly distributes time for a request processing, the number of the request processings and the like for each process and performs a several fold request processing for a particular process ID.

Also, the OS employs a method that apparently makes the speed of the input/output processing faster by reserving a temporary storage area in the main memory and holding the data of the external storage apparatus. This temporary storage area is referred to as a cache, a file cache, an I/O cache, a buffer, an I/O buffer and the like (hereafter, they are collectively referred to as the cache).

In the current computer, typically, the data transfer between the processing unit and the main memory is faster than the data transfer between the external storage apparatus and the main memory. For this reason, the OS, when inputting or outputting data from or to the external storage apparatus, inputs or outputs the data from or to the cache for the meanwhile, and then chooses a proper timing and carries out the data input/output between the cache and the external storage apparatus. From a viewpoint of the process, the input/output processing has been completed when the data can be inputted from or outputted to the cache. When the data area is often reused, the data input/output from/to the cache is repeated, which can avoid the data input/output from/to the external storage apparatus. Thus, the input/output can be made faster.

In data-reading, a time when data does not exist on the cache area becomes timing when the data is inputted (read) from the external storage apparatus. The OS reads the data from the external storage apparatus to the cache at that timing. In data-writing, in order to reflect data updated on the cache area to the external storage apparatus, a predetermined event becomes a trigger of data output (writing). The OS writes the data of the cache area to the external storage apparatus at that output trigger. In this way, an operation for writing (outputting) the data updated on the cache area to the external storage apparatus at certain timing is referred to as a write-back.

Unless the data is reflected, the update data held on the cache is not reflected to the external storage apparatus. Thus, this causes a data inconsistency and the like. As the output trigger from the cache to the external storage apparatus, one example is every certain time interval. Also, another example is a time when an unused area in the main memory becomes small. Also, still another example is a time when the amount of the updated data reaches a certain quantity or more. Yet still another example is a time when the input/output processing from/to the external storage apparatus is not carried out.

A cache managing mechanism carries out control of the cache. The cache managing mechanism manages allocation and deallocation of an area of the cache and a use situation of the cache (a relation between the cache and a target file and the like). The cache managing mechanism exists while being mixed with a file system or a main memory managing system, in many cases. Also, the write-back of the cache is executed by a write-back process.

For example, "Writing Dirty Pages to Disk", which is written by DANIEL P. BOVET, MARCO CESATI, Understanding the LINUX KERNEL, U.S., O'REILLY, November 2005, Pages 622 to 630 discloses a write-back process of the Linux. That is, in the Linux, the write-back process referred to as the bdflush or the pdflush executes the write-back. The write-back process retrieves the cache area on which update is performed, namely, the cache area to which writing is executed, at the above-mentioned timing as a trigger. Then, a data output request to output (write) the data in the update cache area to the external storage apparatus is generated and issued to the input/output scheduling mechanism. At this time, in order to improve a retrieving speed, the update cache area can be also managed in advance in an update list and the like.

The write-back process, when issuing the data output request, selects the proper update cache area and issues the output request, instead of outputting all of the update data at a time. As a method of selecting the update data, one example is an LRU (Least Recently Used) method that prioritizes the data having the oldest data use time. Also, another example is a method that executes retrieving at a file system order. Also, still another example is a method that selects only the cache area for the particular external storage apparatus. Moreover, yet still another example is a method in which the methods of selecting the update data as mentioned above are combined. Also, as the data amount when the update data is selected, some examples are a file unit, a constant page size (including a single page) and the like.

The data output request to the external storage apparatus includes: at least an identifiers (for example, a PCI device number and a device number, a major number and a minor number in the Linux, and the like) to specify the external storage apparatus of an output destination; and information (for example, an address of the data, a page number and the like) to indicate the selected cache area to be reflected into the external storage apparatus.

FIG. 1 is a conceptual view describing input/output using a cache in the conventional technique. A process 1 and a process 2 repeat data input/output and consequently execute programs. The processes 1, 2 request an OS 1000 to input or output the data. Then, the OS 1000 uses a cache 1300 and makes the input/output from/to the processes 1, 2 fast. A cache managing mechanism 1320 allocates the cache 1300 in a main memory 1200. The cache managing mechanism 1320 allocates a cache area 1310 inside the cache 1300 for handling the input/output requests from the processes 1, 2. In FIG. 1, the numeral following "PROCESS" is defined as a process ID, and a y-th data input/output request of the process ID=x is represented as "x-y", for the input/output request.

At first, an example of an input case will be described.

For example, for an input request "1-1" from the process 1, the cache managing mechanism 1320 allocates a cache area "1-1" in the cache area 1310. Since data does not exist on the cache area "1-1", the OS 1000 issues a data input request to an input/output scheduler 1400, in its original state of a context of the process 1. The input/output scheduler 1400 requests the input request "1-1" to an external storage apparatus 1600 and transfers the data from the external storage apparatus 1600 to the cache area "1-1" in the cache area 1310. The OS 1000 replies the read data to the process, namely, copies or maps to a process space. Then, the reading request is completed.

In the foregoing input case, when the OS 1000 issues the input request in its original state of the context of the process 1 to the input/output scheduler 1400, the OS 1000 holds process information (e.g.: Process ID) of the process currently being operated, whose input request has been issued. Thus, the input/output scheduler 1400, when receiving its input request, can specify its process information. For example, in the foregoing example (input request "1-1"), it is possible to specify that the process ID of a request source of the input request is 1 (one). Here, the input/output scheduler 1400 can execute the input/output control that uses the priority and the like based on the process (e.g.: Process ID), as mentioned above. Thus, in the case shown in FIG. 1, the processing with regard to the input request can be executed on the basis of the priority and the like of the process. Consequently, it is possible to improve the responsibility of the processing with regard to the input executed by the input/output scheduler.

With regard to the same input request (read request) "1-1" on and after a next time, the cache area "1-1" corresponding to its input request exists on the cache 1300. Thus, the processing for the input request is completed when the data is copied or mapped from its cache area "1-1" to the process space. For this reason, the read speed can be improved.

An example of an output case will be described below.

For an output request "1-3" from the process 1, the cache managing mechanism 1320 allocates a cache area "1-3" in the cache area 1310. The processing for the output request is completed when a write data is copied from the process space to the cache area "1-3" in the cache area 1310. From the viewpoint of the process, the output processing is ended only for the output to the cache 1300. Thus, the output processing can be executed at a high speed. On the other hand, actually, a write-back process 1500 reflects the output result, namely, the update data to the external storage apparatus 1600.

In FIG. 1, a data output request to the external storage apparatus 1600 from the write-back process with respect to a data output request "x-y" from the process is represented as "RB(x-y)". The write-back process 1500 is activated at the foregoing timing as the trigger and begins the write-back. The write-back process 1500 finds the cache area "1-3" in the updated cache area 1310 to carry out the output to the external storage apparatus 1600. That is, the write-back process 1500 issues the output request to the external storage apparatus 1600 for the cache area "1-3" in the updated cache area 1310 to the input/output scheduler 1400. At this time, the output request is issued as a context of the write-back 10, process 1500. For this reason, as the output request "RB(1-3)" to the external storage apparatus 1600, it is treated in the input/output scheduler 1400. The foregoing write-back can attain consistency between the update data of the cache area 1310 and the data of the external storage apparatus 1600.

However, the attainment of the input/output performance improvement by using the cache brings about a problem that performance and responsibility of the computer are dropped. This is because the cache managing mechanism 1320 uniquely treats the cache 1300 on the OS 1000 and does not take care of the process 1100. The cache managing mechanism 1320 does not use the process information. Thus, for example, when a certain process 1100 begins to indefinitely use the cache 1300 and monopolizes the main memory 1200, a new cache area cannot be allocated on the main memory 1200 at the time when input/output of another process 1100 is generated. For this reason, in order to allocate a necessary cache area, the cache area currently being used is required to be deallocated, which leads to a significant drop of computer performance.

As one means to solve such a computer performance drop, a method of limiting cache capacity for each process is described in Japanese Laid-Open Patent Application JP-P 2006-350780A (corresponding to U.S. Patent Application US2006288159). A cache managing mechanism determines cache capacity for each process, based on an obtainment setting parameter set for cache management information. Then, the cache managing mechanism controls allocation and deallocation of a cache area so that the process does not exceed the determined cache capacity of the cache area whose allocation is newly requested. This prevents a cache area for a particular process from being depleted.

However, even a case of using the technique of Japanese Laid-Open Patent Application (JP-P 2006-350780A (corresponding to U.S. Patent Application US2006288159), the fact that the processing for reflecting the update data to the external storage apparatus 1600 is executed by the write-hack process is not changed.

In this output case, a write-back process 1500 issues an output request, as the context of the write-back process 1500, to the input/output scheduler 1400. The OS 1000 holds the information of the write-back process, as the process currently being operated, which issues the input request. For this reason, the input/output scheduler 1400, when receiving the output request, specifies the process information as the write-back process. That is, it is impossible to specify process information of an original source that issues the output request. For example, in the foregoing example (output request "RB (1-3)", the process of the request source of the output request is specified as the write-back process, and the process ID=1 of the original source cannot be specified. Moreover, the data itself stored in the cache area 1310 does not include the process information (e.g.: Process ID) indicating which process the data belongs to. For this reason, the process ID=1 of the original source cannot be specified from even the data itself.

In this way, the output request RB (x-y) is specified as the output request executed by the write-back process. Thus, the input/output scheduler 1400 cannot execute the input/output control that uses the priority based on the process (e.g.: Process ID) and the like as mentioned above. Thus, in the case as shown in FIG. 1, the processing with regard to the output request cannot be executed on the basis of the priority of the process and the like. That is, it is impossible to improve the responsibility of the processing with regard to the output executed by the input/output scheduler.

FIG. 2A and FIG. 2B are diagrammatic views showing an example of a concept of a processing with regard to input and output in the conventional technique. FIG. 2A shows a case of the input, and FIG. 2B shows a case of the output, respectively. With reference to FIG. 2A, in the input case, the OS 1000 issues input requests from processes 1, 2 and 3 to the input/output scheduler 1400. At that time, the input/output scheduler 1400 can specify process IDs of the processes requesting the input, as request source information of the input. For this reason, the input/output scheduler 1400 can execute input control using priority based on the process ID and the like. On this drawing, as the input control, input processings are uniformly assigned and executed.

On the other hand, with reference to FIG. 2B, in the output case, the write-back process 1500 unifies output requests from the processes 1, 2 and 3 and issues as the output request from the write-back process 1500 to the input/output scheduler 1400. At that time, the input/output scheduler 1400 specifies a process requesting the output as the write-back process, for request source information. For this reason, the input/output scheduler 1400 cannot know the process ID as the request source information and cannot execute the output control using priority based on the process ID and the like. On this drawing, for example, the output processing is executed in an order starting with an old output request or an order starting with a nearby address.

In this way, the conventional cache managing mechanism can protect the performance from the drop caused by the monopolization of the cache, by controlling the cache capacity for each process. However, the problem that the input/output control using the priority executed by the input/output scheduler and the like becomes invalid is not solved. This is because as mentioned above, the cache managing mechanism does not explicitly hold the process information for the cache area and further the data output from the cache to the external storage apparatus is unified as the output of the data to the write-hack process. That is, the input/output scheduler recognizes all as the data output requests from the write-back process. Thus, a parameter to be properly transmitted and to determine the priority of the input/output for the process that carries out the input/output using the cache is not transmitted to the input/output scheduler. In the input/output mechanism using the cache, a technique that the input/output scheduler can suitably determine the priority of the process is desired. A technique that can suitably transmit the information, which is required to determine the priority, to the input/output scheduler is desired.

As the related technique, Japanese Laid-Open Patent Application JP-P 2005-293205A (corresponding to U.S. Patent Application US2005223168) discloses a storage control apparatus, a control method and a control program. This storage control apparatus controls a plurality of storage apparatuses. This storage control apparatus includes: an LRU write-back means for carrying out a write-back to the plurality of storage apparatuses of data that are stored in a cache memory inside the storage control apparatus by using an LRU method; and a write-back schedule processing means for selecting a storage apparatus in which the number of the write-backs executed by the LRU write-back means is small and then performing the write-back of the data on the selected storage apparatus.

WO99/40516 Gazette (corresponding to U.S. Pat. No. 6,748,487) discloses a disk cache control method, a disk array apparatus and a storage apparatus. This disk cache control method is a disk cache control method in the disk array apparatus that includes: a plurality of disk apparatuses in which data is divided and stored; and a disk cache, wherein a plurality of volumes are assigned to the plurality of disk apparatuses. Assignment of a new disk cache area to the data is carried out in an order starting with the disk cache area assigned to an area whose access frequency is lower, when an access frequency is determined for each area where the volume is divided at a certain fixed length.

Japanese Laid-Open Patent Application JP-P 2000-172562A (corresponding to U.S. Pat. No. 6,507,894) discloses an information processing apparatus. This information processing apparatus includes: a main memory; a cache memory holding the copy of a main memory; and a processor including a cache memory controller which, while referring to and updating control information and address information of the cache memory, manages the data inside the cache memory. This information processing apparatus includes a pre-fetching means transferring the data of the main memory to the cache memory without referring to and updating the control information and the address information.

Japanese Laid-Open Patent Application JP-A-Heisei, 8-328956 discloses a memory managing method of a multi processor system. In the memory managing method of this multi processor system, the multi processor system includes a virtual storage mechanism composed of a plurality of processors. The multi processor system includes a memory managing means, a process managing means, an address conversion cache, a bind control means and an invalidation control means. The memory managing means manages a correlation setting between a virtual address and an actual address. The process managing means manages a process executed by the processor. The address conversion cache is provided inside each processor and holds linkage information between the virtual address and the actual address, which are correlated by the memory managing means. About an access request to an external data executed by the process currently being executed in one of the processors, an operating system on the processor asks the memory managing means, and in response to this asking, the memory managing means passes a predetermined virtual address and actual address. At that time, the bind control means reports an instruction for binding its process to its processor until the process finishes the use of the memory page indicated by this actual address, to the process managing means. The invalidation control means invalidates the actual address correlated to the virtual address of the address conversion cache included in the processor, and updates to the passed actual address. The memory managing method of the multi processor system carries out the memory management without requiring the simultaneous invalidation of the address conversion caches included in all of the other processors, even if the correlation setting between the virtual address and the actual address, which is managed by the memory managing means, is updated by the process currently being executed by one of the processors.

DISCLOSURE OF INVENTION

An object of the present invention is to provide an input/output control system, an input/output control method, and an input/output control program for a computer in which an input/output scheduler can suitably execute a scheduling in an input/output mechanism through a cache.

This and other objects, features and advantages of the present invention will be readily ascertained by referring to the following description and drawings.

An input/output control system of the present invention is an input/output control system of an information processing apparatus that includes a first storage area and a second storage area and carries out an input/output processing using a part or whole of the first storage area as a cache. The input/output control system of the present invention includes a cache managing unit, an input/output specification information storage unit, a write-back unit and an input/output specifying unit. The cache managing unit stores data, which is inputted from or outputted to the second storage area, in a third storage area used as a cache of the first storage area. The input/output specification information storage unit correlates a data area, which is an area of the data stored in the third storage area, and information with regard to the input/output to store them. The write-back unit generates an output request of the data from the data area in the third storage area to the second storage area. The input/output specifying unit specifies the information with regard to the input/output correlated to the data area of the data which is a target for the generated output request, by referring to the input/output specification information storage unit.

An input/output control method of the present invention is an input/output control method of an information processing apparatus that includes a first storage area and a second storage area and carries out an input/output processing using a part of the first storage area as a cache. The output control method includes: a step of (a) storing data, which is inputted from or outputted to the second storage area, in a third storage area used as a cache of the first storage area, a step of (b) correlating a data area, which is an area of the data stored in the third storage area, and information with regard to the input/output to store them in an input/output specification information storage unit, a step of (c) generating an output request of the data from the data area in the third storage area to the second storage area; and a step of (d) specifying the information with regard to the input/output correlated to the data area of the data which is a target for the generated output request, by referring to the input/output specification information storage unit.

A program of the present invention is a program that instructs a computer to execute an input/output control method of an information processing apparatus that includes a first storage area and a second storage area and carries out an input/output processing using a part of the first storage area as a cache. The input/output control method includes: a step of (a) storing data, which is inputted from or outputted to the second storage area, in a third storage area used as a cache of the first storage area, a step of (b) correlating a data area, which is an area of the data stored in the third storage area, and information with regard to the input/output to store them in an input/output specification information storage unit, a step of (c) generating an output request of the data from the data area in the third storage area to the second storage area; and a step of (d) specifying the information with regard to the input/output correlated to the data area of the data which is a target for the generated output request, by referring to the input/output specification information storage unit.

BRIEF DESCRIPTION OF THE DRAWINGS

FIG. 1 is a conceptual view describing input/output using a cache in the conventional technique;

BEST MODE FOR CARRYING OUT THE INVENTION

Exemplary embodiments of an input/output control system, an input/output control method and an input/output control program according to the present invention will be described below with reference to the attached drawings.

First Exemplary Embodiment

The first exemplary embodiment of the input/output control system, the input/output control method and the input/output control program of the present invention will be described below with reference to the attached drawings. Regarding the present invention, in order to mainly describe that information with regard to input/output of a process is transmitted in the input/output using a cache, configuration members with regard to cache control and input/output request generation from the cache will be mainly described.

Figure 2A:
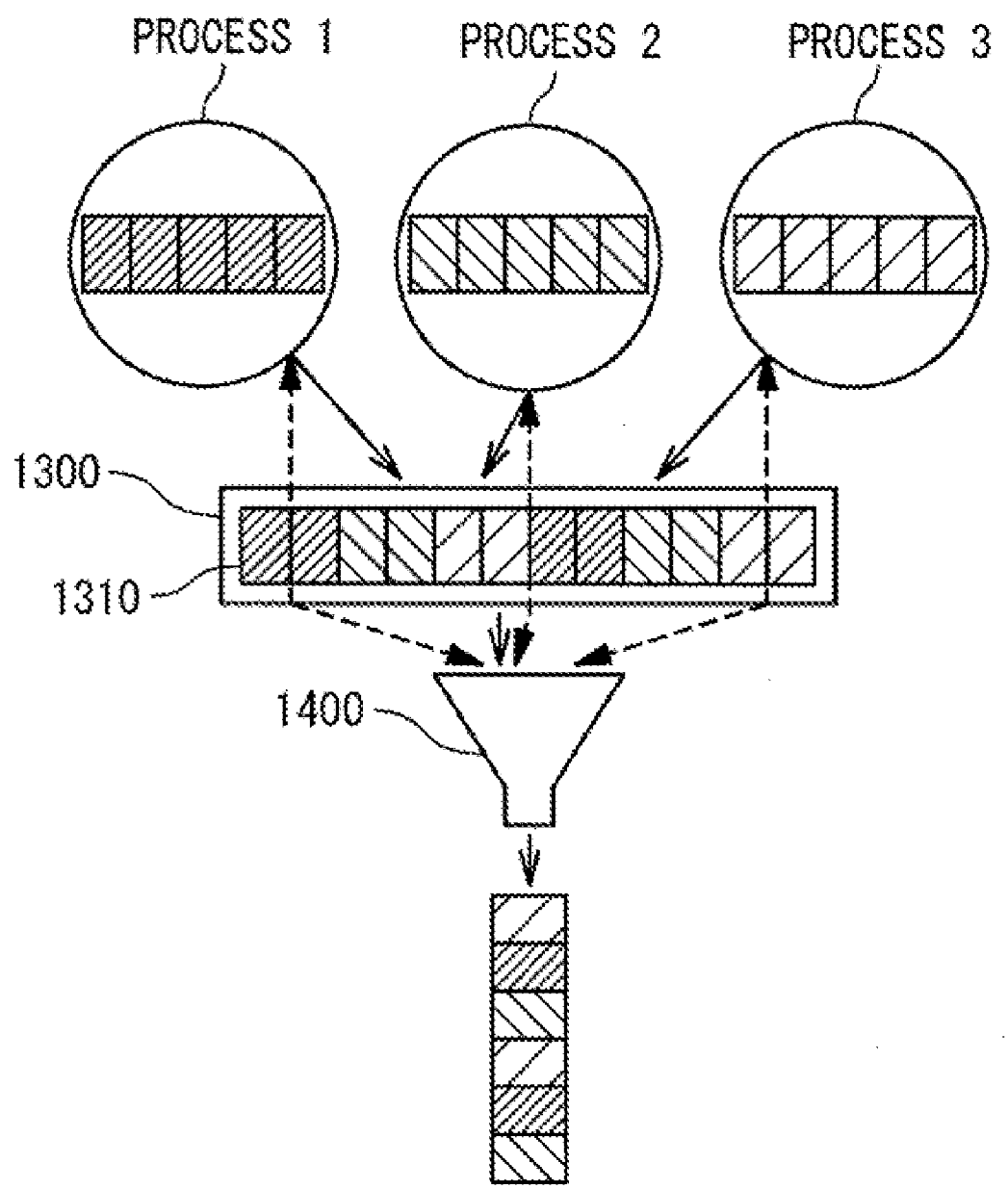
FIG. 2A is a diagrammatic view showing an example of a concept of a processing with regard to input and output in the conventional technique.
Figure 2B:
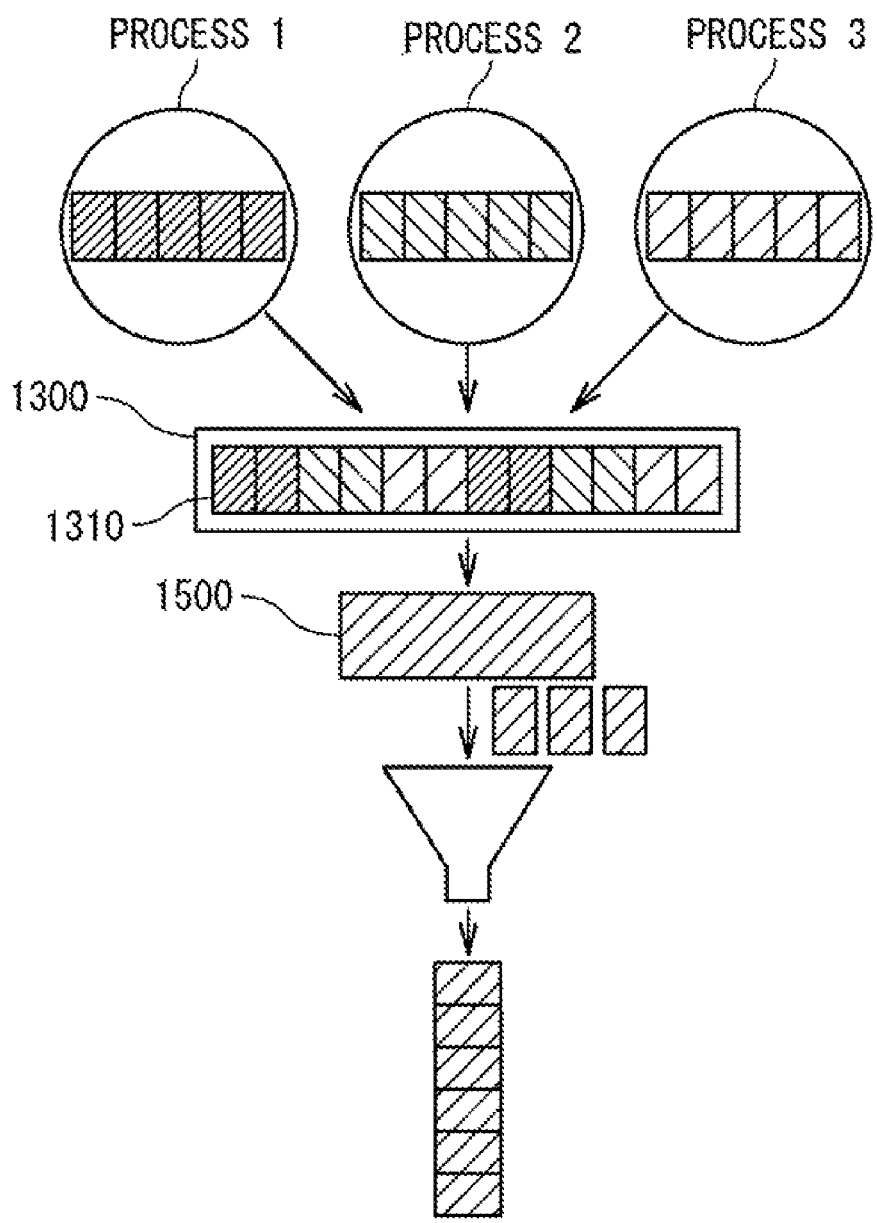
FIG. 2B is a diagrammatic view showing an example of a concept of a processing with regard to input and output in the conventional technique.
Figure 3:
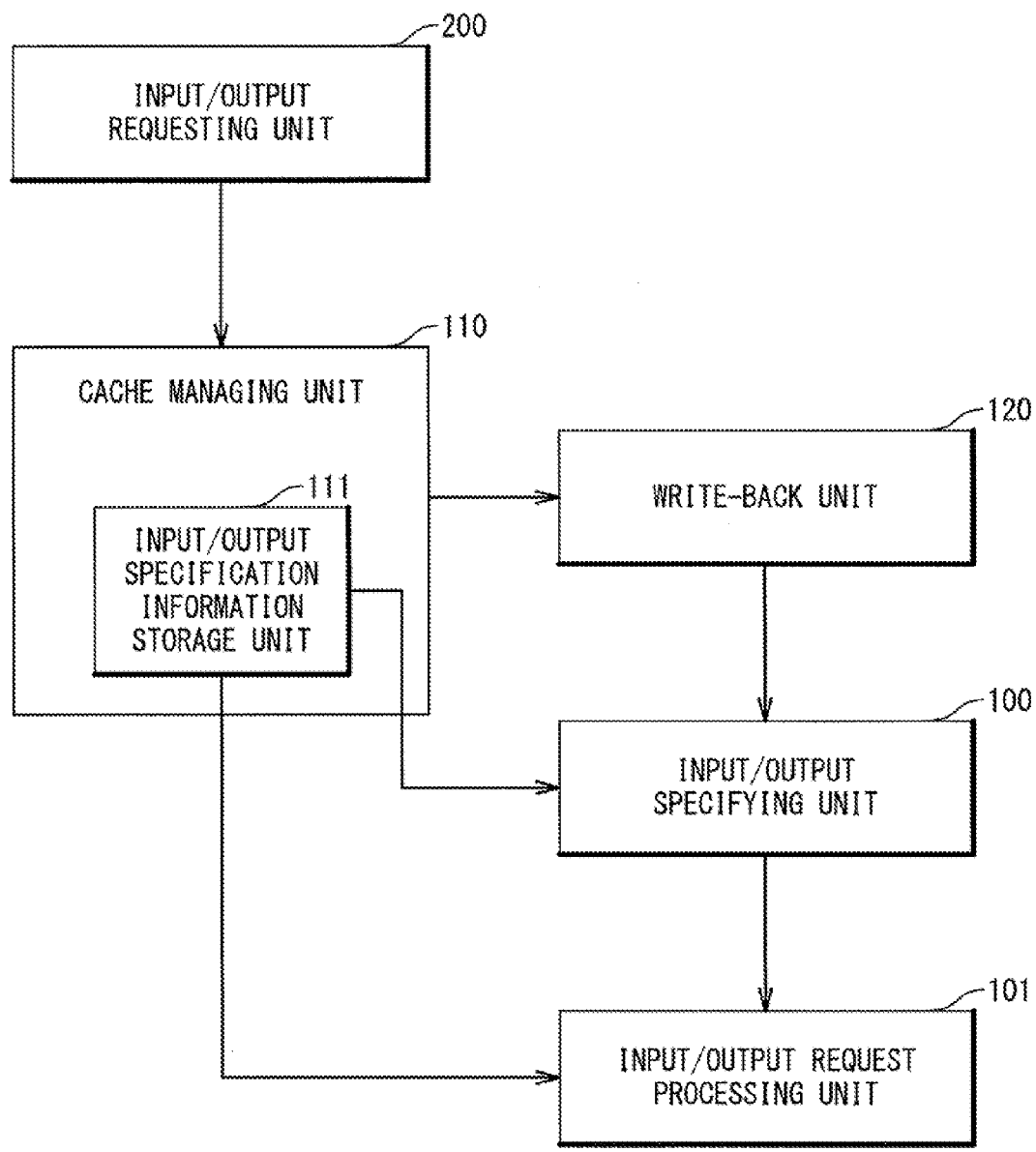
FIG. 3 is a block diagram showing a configuration of a first exemplary embodiment of an input/output control system of the present invention.

FIG. 3 is a block diagram showing a configuration of the input/output control system in the first exemplary embodiment of the present invention. The input/output control system is an information processing apparatus that includes a first storage area and a second storage area and carries out input/output processing using a part or whole of the first storage area as a cache. The input/output control system includes a cache managing unit 110, a write-back unit 120 and an input/output specifying unit 100, serving as an input/output control program. The input/output control program (input/output control method) of the present invention is installed in the information processing apparatus exemplified as a personal computer, and this functions as the input/output control system of the present invention.

The cache managing unit 110 stores data, which is inputted from or outputted to the second storage area, in a third storage area used as the cache of the first storage area. The first storage area is exemplified as a semiconductor memory, and the second storage area is exemplified as HDD (Hard Disk Drive). The cache managing unit 110 includes an input/output specification information storage unit 111. The input/output specification information storage unit 111 correlates a data area, which is an area of the data stored in the third storage area, and information with regard to input/output, and stores them. The information with regard to the input/output is exemplified as information with regard to a request source of the input/output. The write-back unit 120 generates an output request of the data from the data area in the third storage area to the second storage area. The input/output specifying unit 100 specifies the information with regard to the input/output correlated to the data area of the data, which is a target for the generated output request, by referring to the input/output specification information storage unit 111.

The cache managing unit 110 links with an input/output requesting unit 200 and an input/output request processing unit 101. The cache managing unit 110 is operated when the input/output requesting unit 200 requests the data input/output using the cache. Here, the input/output requesting unit 200 receives the input/output request of the data from the program (process). The input/output request processing unit 101 obtains the information with regard to the specified input/output and executes the processing related to the request of the input/output.

Next, an operation (exemplary embodiments of the input/output control method and the input/output control program) of the input/output control system in the first exemplary embodiment of the present invention will be described with reference to FIG. 3. Here, an operation for an output request of data from a program will be described.

At first, when the data output request is issued from the input/output requesting unit 200 of the program, the cache managing unit 110 stores the data, which is inputted from or outputted to the second storage area, in the third storage area used as the cache of the first storage area. Next, the cache managing unit 110 correlates the data area, which is the area of the data stored in the third storage area, and the information with regard to the input/output and stores them in the input/output specification information storage unit 111. After that, the write-back unit 120 generates the output request of the data from the data area in the third storage area to the second storage area. In succession, the input/output specifying unit 100 specifies the information with regard to the input/output correlated to the data area of the data, which is a target for the generated output request, by referring to the input/output specification information storage unit 111. Then, the input/output request processing unit 101 obtains the information with regard to the specified input/output and executes the processing related to the request of the input/output.

In the output case in the present invention, the input/output request processing unit 101, when executing the processing related to the request of the input/output, can obtain and specify the information with regard to the input/output, by means of the functions of at least the input/output specification information storage unit 111 and the input/output specifying unit 100. Consequently, it is possible to specify the request source of the original source of the output request or the information related thereto. Thus, the input/output request processing unit 101 can execute the processing related to the request of the input/output, based on the request source of the original source of the output request or the information related thereto.

Specific exemplary embodiments of the present invention will be described below in the second to fourth exemplary embodiments.

Second Exemplary Embodiment

The second exemplary embodiment of the input/output control system, the input/output control method and the input/output control program of the present invention will be described with reference to the attached drawings.

Figure 4:
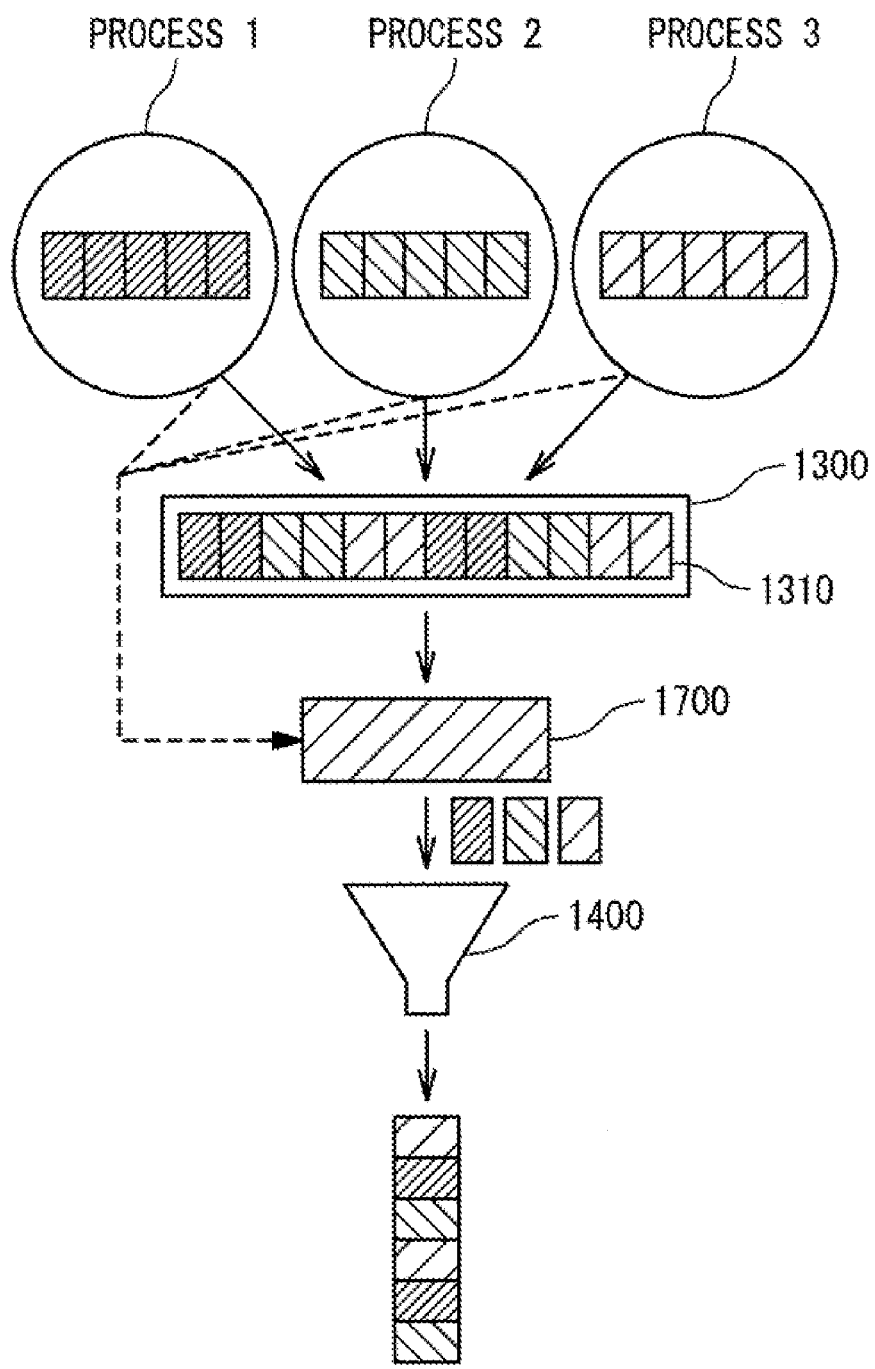
FIG. 4 is a diagrammatic view showing a concept of a second exemplary embodiment of an input/output control system, an input/output control method and an input/output control program of the present invention.

FIG. 4 is a diagrammatic view showing a concept of the input/output control system, the input/output control method and the input/output control program in the second exemplary embodiment of the present invention. With reference to FIG. 4, in an output case in the present invention, a relation between a cache area and processes 1, 2 and 3 is stored in advance prior to execution of a write-back process. For this reason, a write-back process 1700 can refer to the relation and consequently specify process IDs that are request sources of original sources of their output requests, when issuing the output requests from the processes 1, 2 and 3 to the input/output scheduler 1400. Thus, the write-back process 1700, using the process ID, can make the input/output scheduler 1400 to recognize (specify) that the process requesting the output (request source information of the output) is the process 1, 2 or 3 of the original source and is not the write-back process 1700. Consequently, the input/output scheduler 1400 can execute output control that uses priority based on the process ID and the like. On this drawing, as the output control, an output processing is uniformly assigned and executed.

The second exemplary embodiment of the input/output control system, the input/output control method and the input/output control program of the present invention will be specifically described below. Regarding the present invention, in order to mainly describe that information with regard to input/output of a process is transmitted in the input/output using a cache, configuration members with regard to cache control and input/output request generation from the cache will be mainly described.

Figure 5:
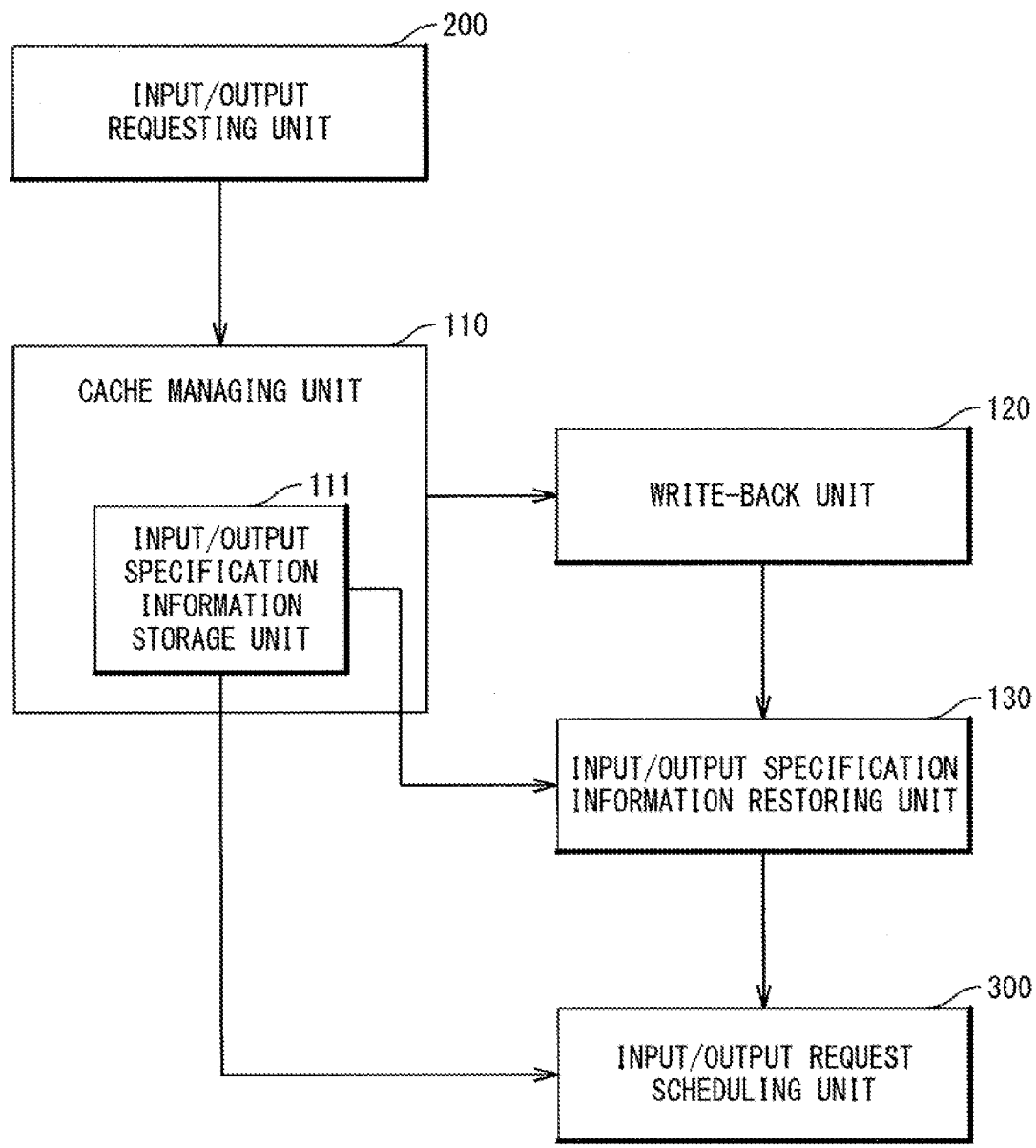
FIG. 5 is a block diagram showing a configuration of the second exemplary embodiment of the input/output control system of the present invention.

FIG. 5 is a block diagram showing a configuration of the second exemplary embodiment in the input/output control system of the present invention. The input/output control system includes a cache managing unit 110, a write-back unit 120, and an input/output specification information restoring unit 130, serving as an input/output control program. The input/output control program (input/output control method) of the present invention is installed in an information processing apparatus exemplified as a personal computer, and this functions as the input/output control system of the present invention.

The cache managing unit 110 includes an input/output specification information storage unit 111, in addition to the cache managing function included in the conventional cache managing mechanism 1320 (FIG. 1). The cache managing unit 110 links with an input/output requesting unit 200 and an input/output request scheduling unit 300. The cache managing unit 110 is operated when the input/output requesting unit 200 requests data input/output using a cache.

Here, the input/output requesting unit 200 receives an input/output request of data from a program (process). The data input/output request scheduling unit 300 schedules an input/output request of data to the external storage apparatus. The input/output requesting unit 200 is exemplified as a program for receiving an input/output request included in the OS, or as a portion responsible for input/output of a program (process). The input/output request scheduling unit 300 is exemplified as an input/output scheduler 1400 included in the OS.

However, the input/output request from the program (process) includes information indicating the request of the input/output, and information specifying the process. The information indicating the request of the input/output is exemplified as a request identifier, a data position and quantity, a position of an input/output buffer (including a cache area) or the like. The information specifying the process is exemplified as an input/output destination identifier and may include an identifier of a process group or a process such as a process group ID or a process ID and priority of the input/output.

The cache managing unit 110 manages a cache area, for input/output request of data from the input/output requesting unit 200. As the management of the cache area, at least, allocation and deallocation of a cache necessary for data input/output, and management based on a correspondence table (mapping table) between an address of a file and a data position at the external storage apparatus are carried out. Specifically, the following management is carried out.

The cache managing unit 110 reads data from a cache area, when the data is already stored in the cache area, for an input request of the data from the input/output requesting unit 200. On the other hand, when the data is not stored, after allocation of the cache area, an input request of the data from the external storage apparatus to the cache area is generated and issued to the input/output request scheduling unit 300.

The cache managing unit 110 writes the data to the cache area when a write area is already allocated in the cache area, for an output request of the data from the input/output requesting unit 200. On the other hand, when the write area is not allocated in the cache area, a new cache area is allocated, and a correspondence relation between an address of a file and a data position in the external storage apparatus is established. Then, the data is written to the cache area. Here, the establishment of the correspondence relation is, for example, to register information with regard to the output request in the correspondence table (mapping table). Incidentally, an update flag is set for the write cache area in order to store presence or absence of the updating of the data. The update flag is referred to judge whether or not it is the update data area, when the write-back unit 120 outputs the update data to the external storage apparatus.

Moreover, the cache managing unit 110 obtains information required to specify the input/output corresponding to the cache area and stores the obtained information in the input/output specification information storage unit 111. Here, the information required to specify the input/output is parameter information serving as a guide when the input/output scheduler unit 300 schedules the input/output. Hereafter, this information is referred to as input/output specification information. As described later, using the input/output specification information, the input/output scheduler unit 300 can execute output control using priority and the like.

The input/output specification information is, for example, an identifier of the process or the process group, input/output priority for the process or the process group, an identifier of the external storage apparatus of the input/output destination, or the like. Here, the identifier implies information for individual identification. An example is a pointer to a structure in which management information is stored, the number such as an ID, or the like. When the input/output specification information is, for example, the process ID, the process group ID or the like, the cache managing unit 110, when receiving the input/output request from the program (process), can obtain the input/output specification information, as the process information of the process currently being operated which is held by the OS. Also, when the input/output specification information is, for example, the identifier of the external storage apparatus or the like, it can be directly obtained from the input/output request.

The input/output specification information storage unit 111 stores and manages a relation between the input/output specification information and the cache area. That is, when receiving the information representing the cache area and the input/output specification information from the cache managing unit 110, the input/output specification information storage unit 111 correlates these information with each other, and stores and manages the correlated information. The information indicating the cache area is, for example, a page address of the cache area, the block number of the cache area, or the like. Then, the information is noted in the correspondence table (mapping table).

As the managing method of the input/output specification information storage unit 111, for example, a management table in which the information indicating the cache area and the input/output specification information are correlated (related) can be generated and stored. Also, as another example of the managing method of the input/output specification information storage unit 111, the input/output specification information can be added as a parameter to a management structure in which the OS manages the cache. In this case, for example, a method is considered which adds the identifiers of the process and the process group to a page structure or an address space structure indicating the cache area of a memory management structure so that they are correlated.

The write-back unit 120 carries out a write-back of the update cache area. That is, the write-back unit 12 generates an output request of the data to instruct the input/output scheduler unit 300 to carry out a processing for reflecting properly the update data to the external storage apparatus, at the output timing of the data to the external storage apparatus as mentioned above. The data output request is similar to the input/output request from the program (process). However, it may have information indicating that the output request source of the data is the write-back unit 120. The write-back unit 120 corresponds to the write-back process 1700 in FIG. 4.

The write-back unit 120 is approximately similar to the write-back process 1500 in the background technique. However, the write-back unit 120 differs in that the write-back unit 120 can refers to the input/output specification information stored in the input/output specification information storage unit 111 as selection of the update data. That is, for example, by extracting the identifier of the particular process from the input/output specification information, it is possible to attain the method of selecting only the cache area for the particular process. By carrying out the output processing only in the selected cache area, it is possible to substantially give the priority to the output request. Moreover, a method in which the update data selecting method and the conventional update data selecting method are combined by using the input/output specification information may become the selecting method of the update data. The write-back unit 120 issues the data output request to the external storage apparatus to the input/output specification information restoring unit 130.

The input/output specification information restoring unit 130 restores the input/output specification information stored in the input/output specification information storage unit 111, for the data output request from the write-back unit 120 to the external storage apparatus. The restoring of the input/output specification information implies that, even if the write-back unit 120 issues the output request to the input/output scheduling unit 300, the input/output scheduling unit 300 can specify the process information (input/output specification information) that is the transmission source (output request source) of the original source. That is, the input/output specification information restoring unit 130, when receiving the data output request from the write-back unit 120, detects the input/output specification information corresponding to the cache area from the input/output specification information storage unit 111, based on the information indicating the cache area included in the data output request. Then, the input/output specification information restoring unit 130 restores the input/output specification information, and issues the data output request to the input/output scheduling unit 300 while pretending that the process outputting the data output request is not the write-back unit 120 but the process specified by the input/output specification information.

As the restoring method of the input/output information, one example is a method in which the write-back unit 120 refers to the input/output specification information storage unit 111 and temporally converts an output request source information from the information indicating itself (the write-back unit 120) into the input/output specification information (e.g.: Process Identifier and Input/Output Priority) corresponding to the cache area. Consequently, the input/output specification information restoring unit 130 can pretend that the output request is not issued from the write-back unit 120, but issued from the process outputting the data to the cache.

Also, as another restoring method of the input/output information, one example is a method, which prepares a converting unit as a wrapper program in an interface (API) to the input/output scheduling unit 300 and when the input/output scheduling unit 300 tries to read the input/output specification information from a process context, converts into the input/output specification information of the process outputting the data to the cache and passes it.

There is also a case that the write-back process carries out the output request for a plurality of pages at a time. At that time, there is a case that the input/output specification information is different in the plurality of pages. The input/output specification information to be restored at that time is required to be suitable selected.

As an example of the selection of the input/output specification information to be restored, it is possible to select the input/output specification information that has the highest rate of the total capacity for the cache area targeted for the output request. As another example of the selection of the input/output specification information to be restored, it is possible to select the input/output specification information that has the highest input/output priority, namely, the highest priority for the cache area targeted for the output request. As still another example of the selection of the input/output specification information to be restored, it is possible to select the input/output specification information for a finally-updated cache area, for the cache area targeted for the output request.

In this way, the input/output specification information restoring unit 130 can be deemed as the input/output specifying unit 100, which specifies the information (the generation source of the original source of the data output request) with regard to the input/output that is correlated to the data area of the data targeted for the generated output request, by referring to the input/output specification information storage unit 111. Also, the input/output scheduling unit 300 can be deemed as the input/output request processing unit 101, which obtains the information with regard to the specified input/output and executes the processing related to the request of the input/output.

The input/output request scheduling unit 300 schedules the input request of the data from the external storage apparatus, by using the method similar to the conventional method. Also, the input/output scheduling unit 300 refers to the output request source information (the input/output specification information that is temporally restored (converted) to the process outputting the data to the cache from the information indicating the write-back unit 120), for the output request of the data to the external storage apparatus, and determines the priority in the schedule and then carries out the scheduling based on the determined priority.

After the scheduling, the input/output specification information restoring unit 130 returns the converted information, which has influence on the later processing because of the restoring of the input/output specification information, to the original information. That is, as for the output request source information, the input/output specification information that is temporally restored (converted) to the process outputting the data to the cache is returned to the information indicating the write-back unit 120.

Figure 6:
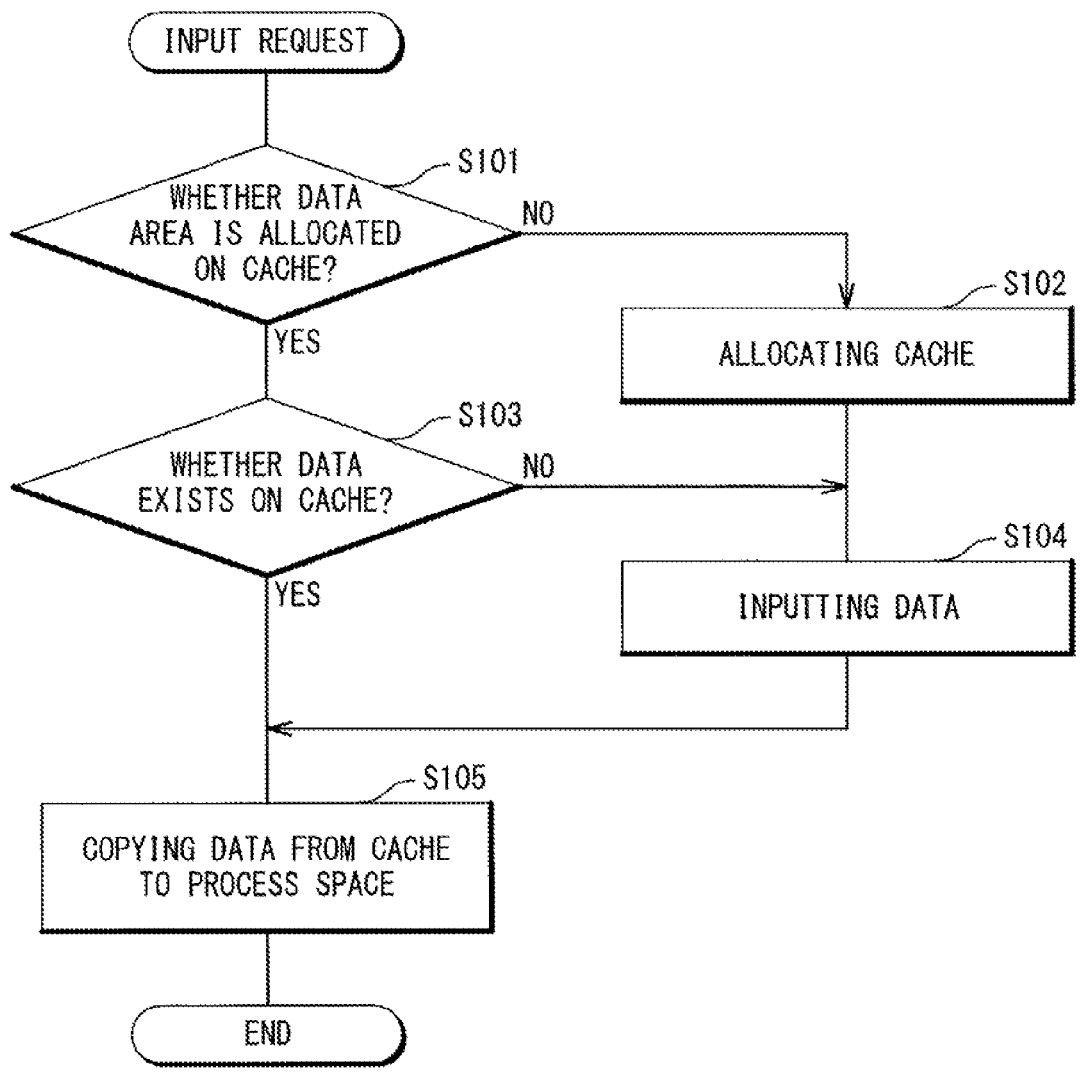
FIG. 6 is a flowchart showing an operation of the second exemplary embodiment of the output control system of the present invention.
Figure 7:
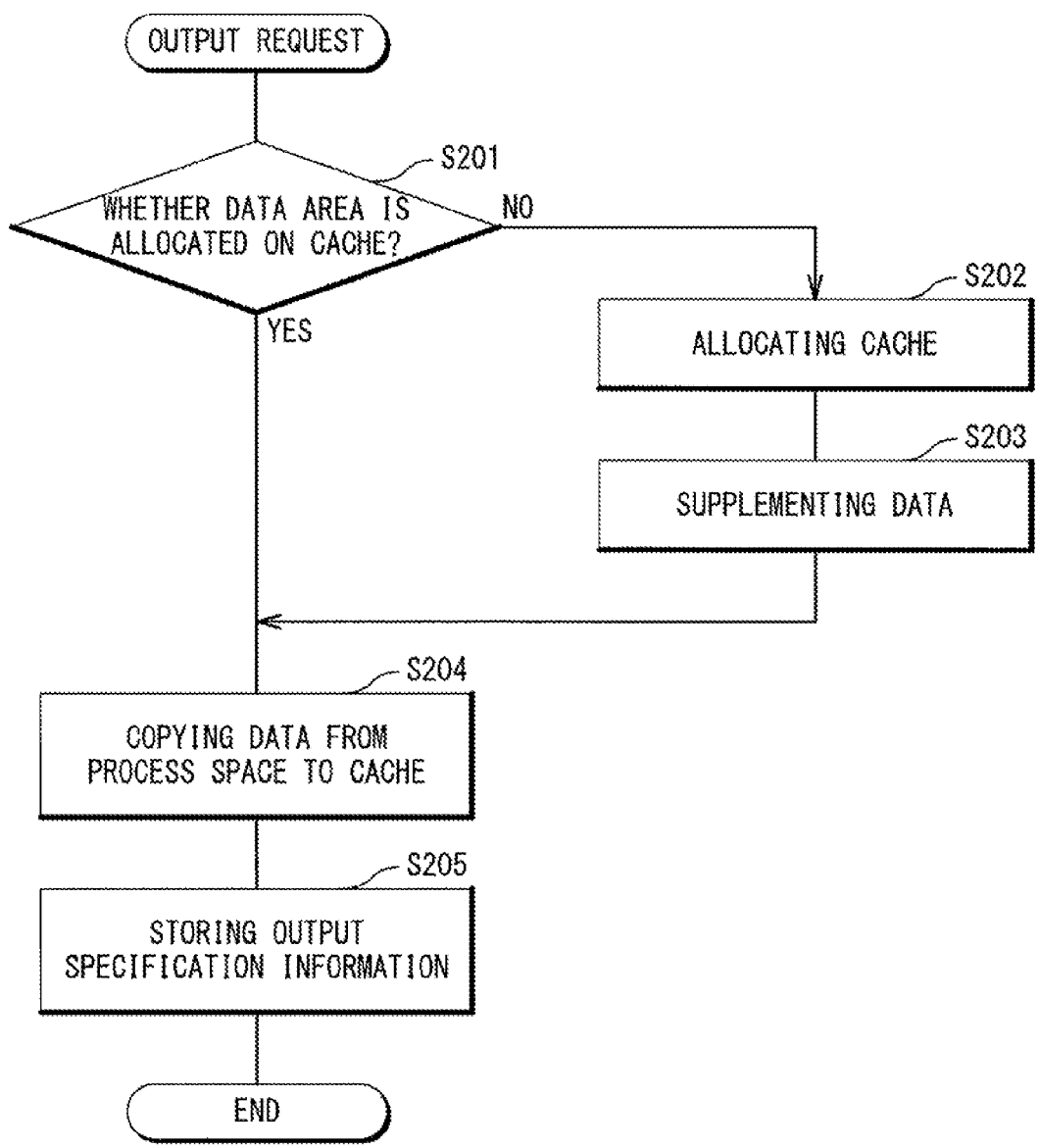
FIG. 7 is a flowchart showing an operation of the second exemplary embodiment of the output control system of the present invention.
Figure 8:
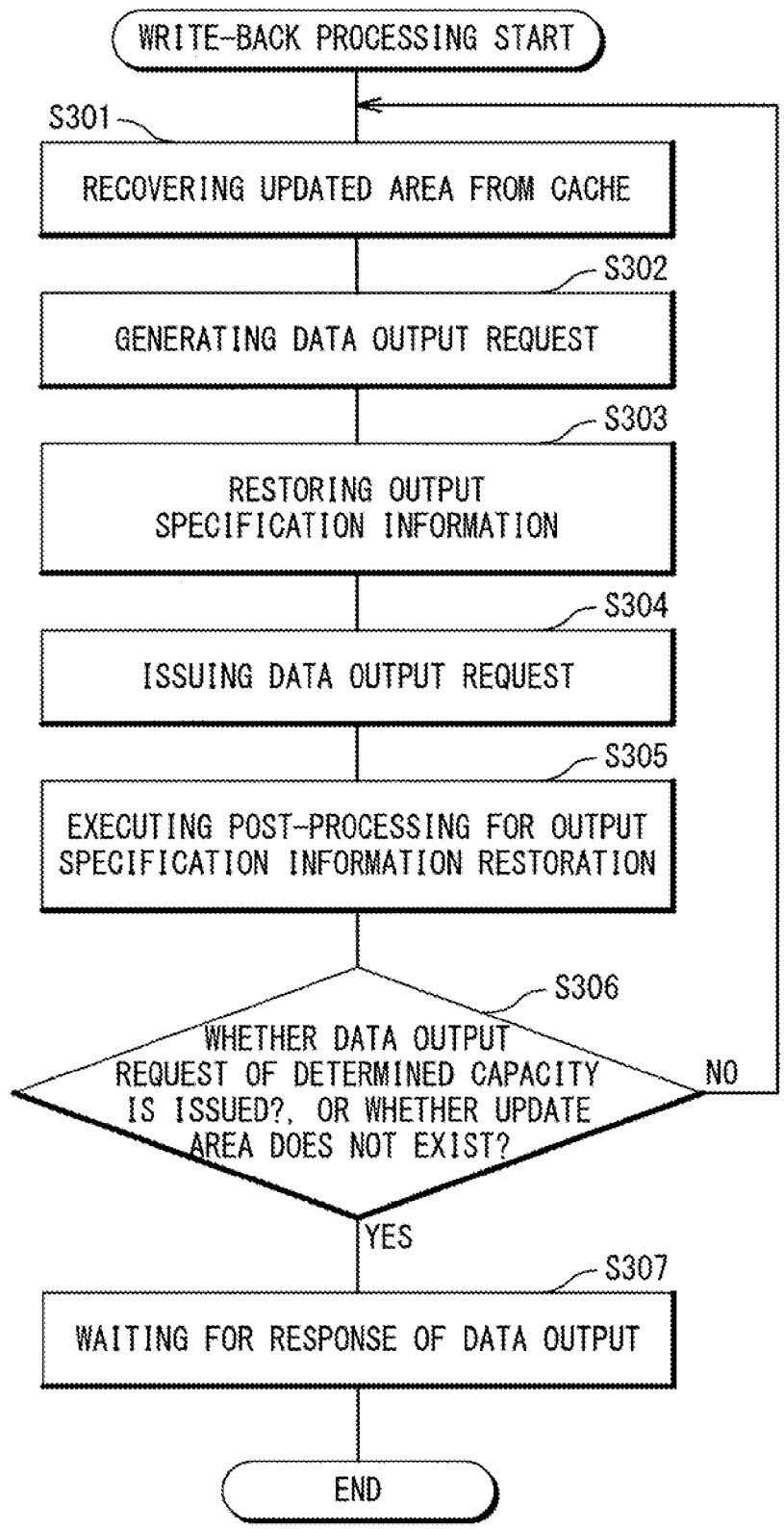
FIG. 8 is a flowchart showing an operation of the second exemplary embodiment of the output control system of the present invention.

Next, an operation of the input/output control system (the input/output control method and the input/output control program) in the second exemplary embodiment of the present invention will be described below with reference to FIGS. 4 to 8. Here, FIGS. 6 to 8 are flowcharts showing operations of the input/output control system in the second exemplary embodiment of the present invention.

At first, an operation for an input request of data from a program will be described with reference to FIG. 6.

At the time of the input request, in order to improve a throughput, there is a case of applying a technique that is typically referred to as "look-ahead" in which a data reading pattern is estimated and read in advance. The present invention is assumed such that this is applied in the input/output requesting unit 200 when the input request is issued. Then, portions of cache allocation after that and a data reading from the external storage will be described.

When a data input request is issued from the input/output requesting unit 200 of a program, the cache managing unit 110 checks whether or not a requested data area is already allocated (Step S101).

At the step S101, if the data area is not yet allocated on a cache (Step S101: NO), the cache managing unit 110 allocates a new cache area in an empty memory area and registers as the data area in cache managing information (Step S102).

At the step S101, if the data area is already allocated on the cache (Step S101: YES), the cache managing unit 110 checks whether or not data already exists on the cache (Step S103).

At the step S103, if the data does not exist on the cache corresponding to the data area (Step S103: NO) or if the new cache area is allocated at the step S102, in order to transfer the data to the cache area, the cache managing unit 110 issues a data input request for the external output apparatus, to the input/output scheduling unit 300. After that, until arrival of a response of ending transmission of the data from the external output through the input/output request scheduling unit 300, the operation becomes in a waiting state (Step S104).

At the step S103, if the data exists on the cache corresponding to the data area or if the transmission of the data onto the cache is completed at the step S104, the cache managing unit 110 transfers the data from the cache to the process space (program) (Step S105).

At this stage, the input processing of the data is completed.

This input processing is handled as an input processing of the process carrying out the input request, because of the processing of the same process context. Incidentally, after the step S105, the cache managing unit 110 may correlate the cache area of the input destination and the input/output specification information and store in the input/output specification information storage unit 111.

An operation for an output request of data from a program will be described below with reference to FIG. 7.

When a data output request is issued from the input/output requesting unit 200, the cache managing unit 110 checks whether or not a requested data area is already allocated (Step S201).

At the step S201, if the data area does not exist on a cache (Step S201: NO), the cache managing unit 110 allocates a new cache area from an empty memory area and registers as the data area in management information (Step S202). Here, the management information is exemplified as a correspondence table (mapping table). The cache managing unit 110, after allocating the new cache area, issues a data input request if necessary, and supplements the data on the cache (Step S203).

At the step S201, if the data area exists on the cache (Step S201: YES), or if the data area is allocated on the cache through the steps S202 and S203, the cache managing unit 110 transfers the data from the process space to the cache (Step S204).

The cache managing unit 110 correlates the cache area of the output destination and the input/output specification information and stores in the input/output specification information storage unit 111 (Step S205).

At this stage, the output processing of the data is completed.

Here, the supplementing the data implies that in an area unit handled in the cache, data before it is written is held at a position except a data output range. That is, the supplementing the data if necessary implies that, when the data output area starts from midstream of the area unit of the cache or ends at the midstream, the data input request is issued to the first or final cache area unit to hold the data. For example, in the Linux of the version 2.6, as a cache area, a cache is handled at a page unit of a memory. At this time, when a data output range covers the entire page area, in order to update all of the data areas, data is not required to be held in advance. However, when the data output range covers a part of the page area, unless the data that is not within the data output range on the cache is held in advance, it is managed as the cache including erroneous data. Hence, this brings about the inconsistency between the data and the original data in the area that is stored in the external storage apparatus. For this reason, the data of the corresponding page is read from the external storage apparatus, and the data is consequently held in advance, thereby keeping the consistency between the data.

An operation of a write-back processing for reflecting update data on a cache to the external storage apparatus will be described below with reference to FIG. 8.

The write-back processing starts a processing with one of the foregoing various timings as a trigger. A capacity to which an update data is reflected and the like are determined based on setting for the timing. With the timing of the write-back processing request as the trigger, the write-hack unit 120 is started (Flowchart Start).

The write-back unit 120 refers to the management information (e.g.: Correspondence Table (Mapping Table)) of the cache managing unit 110 and recovers a data area to be updated from a cache, based on one of the foregoing various policies such as the LRU and the like (Step S301). At this time, the input/output specification information is also stored in the input/output specification information storage unit 111. Thus, the input/output specification information can be referred and used to recover the update data area. For example, it is possible to have the policy such as recovering of only a cache area related to the particular process.

The write-back unit 120 generates a data output request to the recovered cache area and passes to the input/output specification information restoring unit 130 (Step S302).

The input/output specification information restoring unit 130 refers to the information of the input/output specification information storage unit 111 in response to the passed data output request, and restores the input/output specification information (Step S303).

For example, in the program (write-back unit 120) that issues this data output request, an identifier of the process or process group indicating the write-back unit 120, or the input/output priority is changed to an identifier or the like of the process of the output request source of the restored original source. Consequently, this pretends that the output request is not from the write-back unit 120 but from the process outputting the update data (the output request source of the original source) with regard to the input/output scheduling unit 300. Also, in another example, a wrapper API to pretend the restored input/output specification information is set for the API to the input/output scheduling unit 300.

The input/output specification information restoring unit 130, after restoring the input/output specification information, issues a data output request to the input/output request scheduling unit 300 (Step S304). Consequently, the input/output request scheduling unit 300 executes an output processing as the output request through the process corresponding to the restored input/output specification information. Thus, the input/output request scheduling unit 300 can execute the output control based on the priority corresponding to the predetermined process and the like.

After that, the input/output specification information restoring unit 130 returns the information conversion, which has influence on the later processing, to the original information, in the input/output specification information restoring executed at the step S303 (Step S305).

For example, when the identifier of the process of the program (write-back unit 120) issuing the data output request is changed, this brings about a bad influence that the same number process exists in the later process management. For this reason, a post-processing for returning the identifier of the process to the identifier of the process of the program (write-back unit 120) issuing the former data output request is carried out.

The write-back unit 120 and the input/output specification information restoring unit 130 carry out the steps S301 to 5305 and judge whether or not the data output request from the cache of the firstly-determined capacity is carried out (Step S306). Then, if the data output request from the cache of the firstly-determined capacity is not carried out (Step S306: NO), the steps S301 to S305 are repeated by again changing the data reflection condition to the external output apparatus, such as the change of the retrieval range, the change of the various parameters and the like.

At the step S306, if the data output request from the cache of the determined capacity is carried out, if the update data does not exist on the cache, or if the certain number of the retrieval for the cache area is ended (Step S306: YES), the repetition is ended.

Finally, the write-back unit 120 waits for the response of the external storage apparatus for the data output and clears the update flag (Step S307).

Consequently, the write-back processing for reflecting the update data on the cache to the external storage apparatus is completed.

The effect of this exemplary embodiment will be described below.

This exemplary embodiment is designed to store the input/output specification information while this is correlated to the cache, and to restore this at the time of the reflection to the external storage apparatus from the cache. Thus, even in the output of the data in which the cache is used, the input/output specification information can be correctly transmitted to the input/output scheduling unit. Consequently, even in the input/output in which the cache is used, it is possible to provide the function of the set input/output scheduling and avoid the performance drop and the responsibility drop.

Third Exemplary Embodiment

Figure 9:
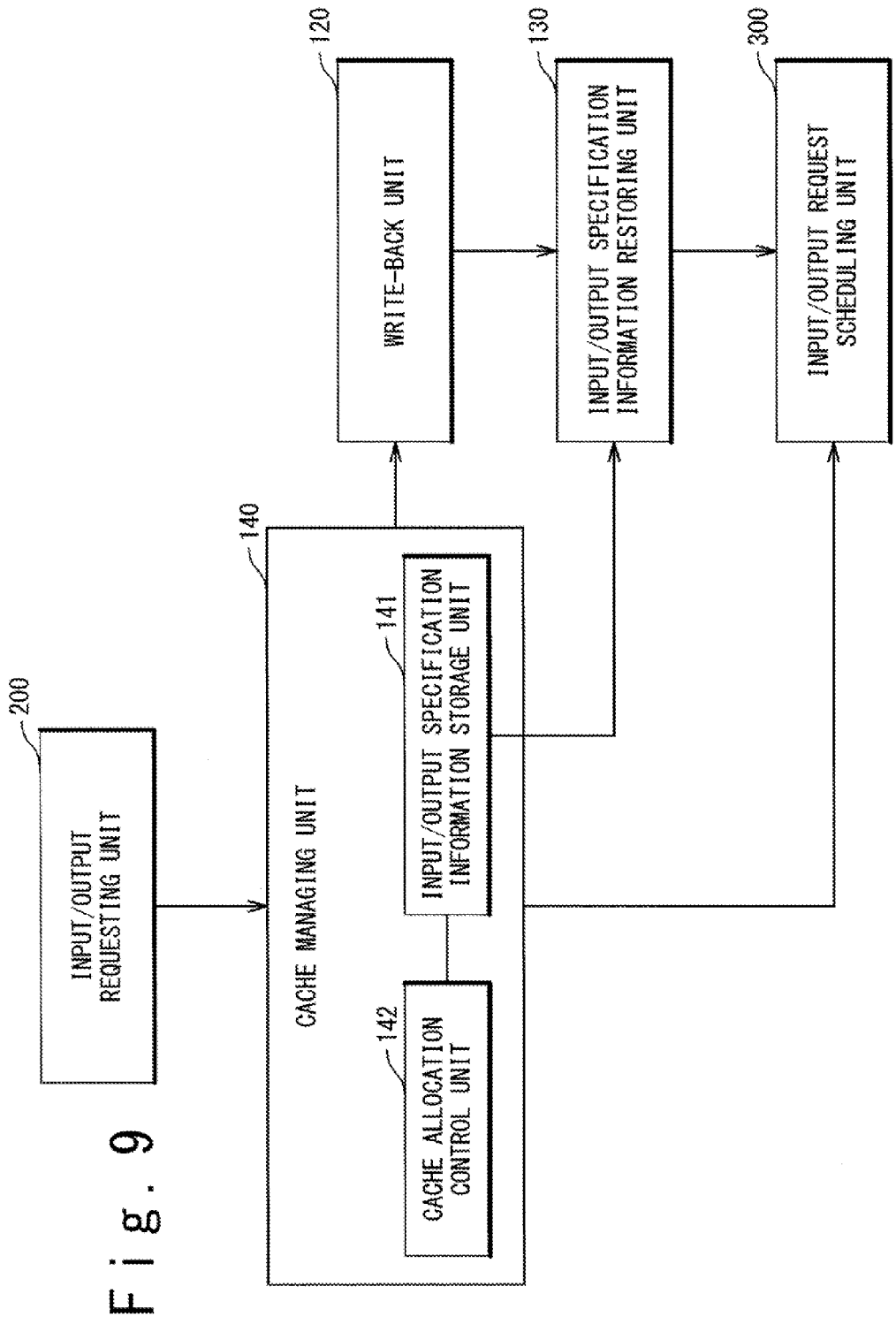
FIG. 9 is a block diagram showing a configuration of a third exemplary embodiment of an input/output control system of the present invention.

The third exemplary embodiment of the input/output control system, the input/output control method and the input/output control program of the present invention will be described below with reference to the attached drawings. FIG. 9 is a block diagram showing the configuration of the input/output control system in the third exemplary embodiment of the present invention. The input/output control system includes a cache managing unit 140, a write-back unit 120, and an input/output specification information restoring unit 130, serving as the input/output control program. The input/output control program (input/output control method) of the present invention is installed in an information processing apparatus exemplified as a personal computer, and this functions as the input/output control system of the present invention.

The cache managing unit 140 includes an input/output specification information storage unit 141 and a cache allocation control unit 142, in addition to the cache managing function possessed by the conventional cache managing mechanism 1320 (FIG. 1). The cache managing unit 140 links with an input/output requesting unit 200 and an input/output request scheduling unit 300. The cache managing unit 140 is operated when the input/output requesting unit 200 requests data input/output using a cache. The input/output requesting unit 200 and the input/output request scheduling unit 300 are equal to those of the second exemplary embodiment. Thus, their explanations are omitted.

This exemplary embodiment differs from the second exemplary embodiment, in the cache managing unit 140, the input/output specification information storage unit 141 and the cache allocation control unit 142. Thus, the cache managing unit 140, the input/output specification information storage unit 141 and the cache allocation control unit 142 will be described. Since the other configurations are similar to the second exemplary embodiment, their explanations are omitted.

The cache managing unit 140 manages a cache area, for an input/output request of data from the input/output requesting unit 200. The cache managing unit 140, when not yet allocating the cache area for the input/output request of the data from the input/output requesting unit 200, uses the cache allocation control unit 142 and allocates a new cache area. When the data is inputted or outputted from or to the cache area, the cache managing unit 140 stores the input/output specification information in the input/output specification information storage unit 141.

The input/output specification information storage unit 141 correlates information indicating the cache area and the input/output specification information, and stores and manages them similarly to the input/output specification information storage unit 111.

The cache allocation control unit 142 refers to the information with regard to the cache that is managed by the input/output specification information storage unit 141 and the cache managing unit 140, and knows a use situation of the cache area. The use situation of the cache area implies information with regard to a manner how the cache area is used by the process, the external storage apparatus, the combination thereof, or the whole system. The information of the use situation of the cache area, for example, includes a cache capacity, a use cache capacity, a use cache rate, a pre-allocated cache area, the maximum cache capacity setting value, a capacity that can be allocated as a new cache, and the like. In particular, by referring to the input/output specification information of the input/output specification information storage unit 141, it is possible to know the relation between the cache area and the process or process group. Thus, it is possible to know the use situation of the cache area for each process or for each process group.

For the cache allocation request from the cache managing unit 140, the cache allocation control unit 142, with reference to the use situation of the cache area, determines whether or not it is possible to allocate a new cache area and an allocation area or allocation capacity in order to allocate the cache, and then responds thereto. Whether or not it is possible to allocate a new cache area can be determined as follows. When the maximum cache capacity setting value pre-set for a process and the requested use cache capacity are compared, if the use cache capacity is less than the maximum cache capacity setting value, the allocation of the new cache area is judged to be possible. On the other hand, if the use cache capacity is equal to or greater than the maximum cache capacity setting value, the allocation of the new cache area is judged to be impossible. The determination can be executed for each process or for each process group included in the input/output specification information.

Another example of determining whether or not it is possible to allocate a new cache area can be carried out as follows. If a cache area pre-allocated by a process is in an unused state, under a condition that the area is preferentially allocated, the allocation of the new cache area is judged to be possible. On the other hand, if the cache area pre-allocated by the process is in a use state and if there is a common cache area that can be further allocated as a new cache except an allocated cache area by the other process, the allocation of the new cache area is judged to be possible. In the other cases, the allocation of the new cache area is judged to be impossible. The determination can be also executed for each process or for each process group included in the input/output specification information.

In this example, the minimum cache area is allocated for each process or for each process group. Thus, it is possible to avoid the performance drop that is caused by the cache monopolization of the single process and the like. Moreover, using a common cache area, the cache area can be enlarged. Thus, it is possible to improve the performance, depending on not the limitation caused by the preliminarily set cache area but the frequency of the input/output, beyond the set cache capacity.

Figure 10:
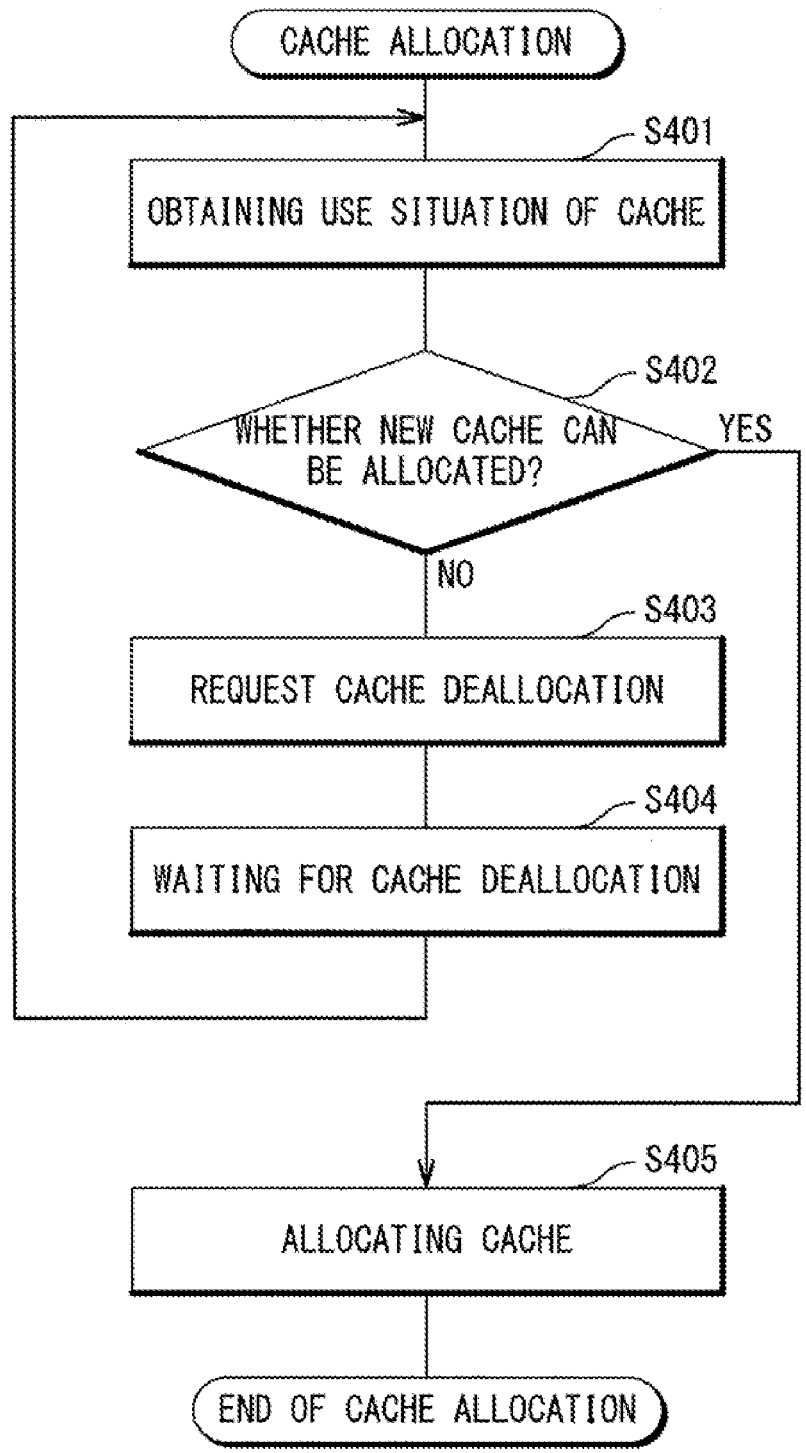
FIG. 10 is a flowchart showing an operation of the third exemplary embodiment of the output control system of the present invention.

An operation of the output control system (the input/output control method and the input/output control program) in the third exemplary embodiment of the present invention will be described below with reference to FIGS. 9 and 10. Here, FIG. 10 is a flowchart showing an operation of the input/output control system in the third exemplary embodiment of the present invention.

The operation in this exemplary embodiment differ from the operation with regard to a cache allocation processing in the second exemplary embodiment, namely, only the operation of the step S102 in the flowchart in FIG. 6 and the operation of the step S202 in the flowchart in FIG. 7. Thus, the operation with regard to the cache allocation processing will be described below with reference to the flowchart in FIG. 10. The operation except the cache allocation processing is equal to those of the second exemplary embodiment. Hence, the explanation is omitted.

When cache allocation is requested to the cache managing unit 140, the cache allocation control unit 142 obtains the input/output specification information from the input/output specification information storage unit 141 and calculates the use situation of the cache (Step S401).

The cache allocation control unit 142 judges whether or not a new cache can be allocated, based on the referred and calculated cache use situation (Step S402).

If the new cache cannot be allocated (Step S402: NO), the cache allocation control unit 142 urges the write-back unit 120 to trigger the cache area deallocation (Step S403). The cache allocation control unit 142 waits for the cache deallocation processing (Step S404). The cache allocation control unit 142, after waiting for the cache deallocation, again obtains the cache use situation and proceeds to fudge whether or not the cache can be allocated (Steps S401, S402).

If the new cache can be allocated (Step S402: YES), the new cache area is allocated in the target cache area (Step S405).

Based on the foregoing processing, the cache allocation processing is executed.

The effect of this exemplary embodiment will be described below.

This exemplary embodiment is designed such that the use situation of the cache can be reflected to the cache allocation processing. Thus, in addition to the effect of the second exemplary embodiment, it is possible to protect the performance drop caused by the cache monopolization of the single process as mentioned above.

Fourth Exemplary Embodiment

The fourth exemplary embodiment of the input/output control system, the input/output control method and the input/ output control program of the present invention will be described below with reference to the attached drawings.

Figure 11:
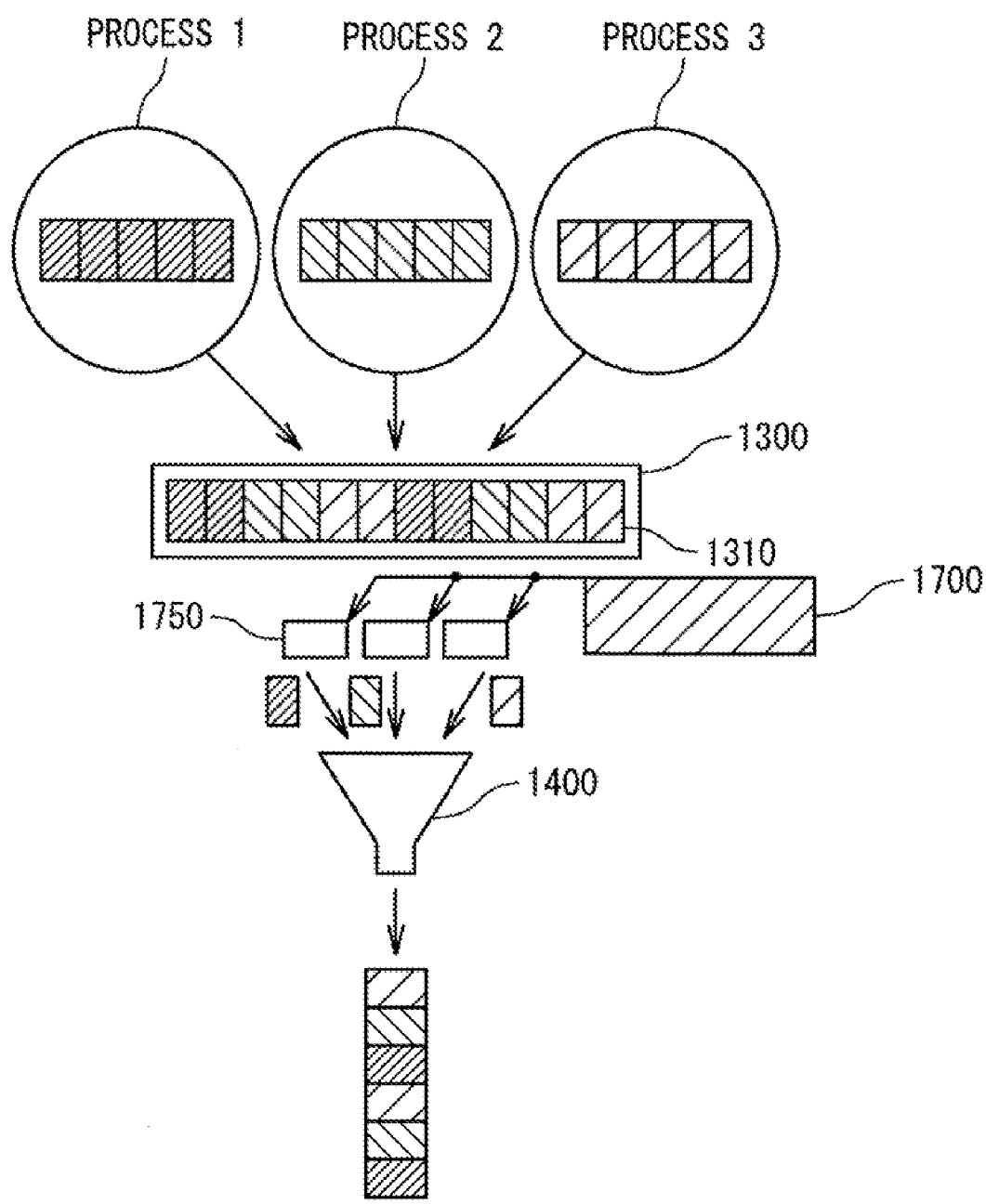
FIG. 11 is a diagrammatic view showing a concept of a fourth exemplary embodiment of an input/output control system, an input/output control method and an input/output control program of the present invention.

FIG. 11 is a diagrammatic view showing a concept of the input/output control system, the input/output control method and the input/output control program in the fourth exemplary embodiment of the present invention. With reference to FIG. 11, in the case of output in the present invention, an I/O command issuing process 1750 installed correspondingly to each of the processes 1, 2 and 3 is prepared in advance prior to execution of the write-hack process. For this reason, the write-back process 1700, when issuing output requests from the process 1, 2 or 3 to the input/output scheduler 1400, instructs the I/O command issuing processes 1750 to issue the output requests. A process identifier of each I/O command issuing process 1750 corresponds to a process identifier that is the request source of the original source of the output request. Thus, it is possible to substantially specify the process that is the request source of the original source of the output request. Thus, the write-back process 1700, since using the I/O command issuing process 1750, can make the input/output scheduler 1400 recognize (specify) that the process requesting the output (the request source information of the output) is the process 1, 2 or 3 of the original source and not the write-back process 1700. Consequently, the input/output scheduler 1400 can execute the output control that uses the priority based on the process identifier and the like. On this drawing, as the output control, the output processing is uniformly assigned.

Incidentally, the foregoing technique can be similarly applied even to the case of the input.

Figure 12:
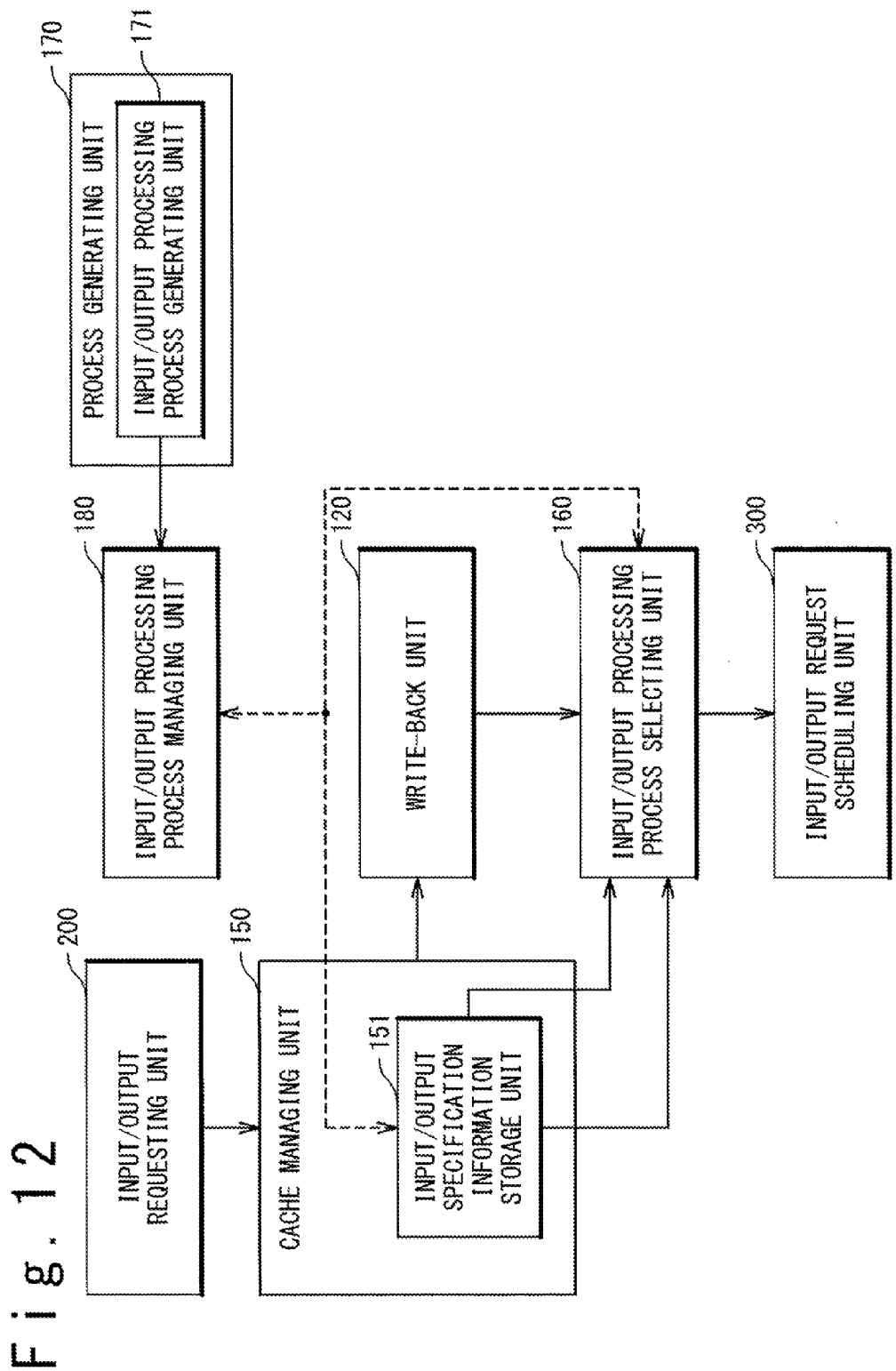
FIG. 12 is a block diagram showing a configuration of the fourth exemplary embodiment of the input/output control system of the present invention.

FIG. 12 is a block diagram showing a configuration of the input/output control system in the fourth exemplary embodiment of the present invention. The input/output control system includes a cache managing unit 150, a write-back unit 120, an input/output specifying process selecting unit 160, a process generating unit 170 and an input/output processing process managing unit 180, serving as the input/output control program. The input/output control program (input/output control method) of the present invention is installed in the information processing apparatus exemplified as a personal computer, and this functions as the input/output control system of the present invention.

The process generating unit 170 includes an input/output processing process generating unit 171. The cache managing unit 150 includes an input/output specification information storage unit 151, in addition to the cache managing function possessed by the conventional cache managing mechanism 1320 (FIG. 1).

That is, this exemplary embodiment differs from the second exemplary embodiment in the cache managing unit 150, the input/output specification information storage unit 151, the process generating unit 170, the input/output processing process generating unit 171 and the input/output processing process managing unit 180. Thus, those respective units will be described. The other configurations are similar to those of the second exemplary embodiment. Hence, their explanations are omitted.

The process generating unit 170, when receiving a process generation system call, for example, from an application, controls generation of a process. In the process generating unit 170, in addition to the generated existing process, the input/output processing process generating unit 171 generates an input/output processing process serving as a pair. The input/output processing process is a process for issuing an input/output request to the external storage apparatus, instead of the write-back unit 120, correspondingly to the input/output request of the existing process. Hereafter, the existing process is referred to as a processing process.

Here, the input/output processing process is generated for each processing process or each group of the processing processes. The input/output processing process corresponds to the I/O command issuing process 1750 in FIG. 11. The processing process corresponds to the processes 1, 2 and 3 in FIG. 11. The write-back unit 120 corresponds to the write-hack process 1700 in FIG. 11.

The input/output processing process generating unit 171 generates the input/output processing process, correspondingly to the fact that the process generating unit 170 generates the processing process. The input/output processing process generating unit 171, when generating the input/output processing process, transmits information with regard to the input/output processing process to the input/output processing process managing unit 180. The input/output processing process managing unit 180 manages the information with regard to the transmitted input/output processing process. The information with regard to the input/output processing process includes an identifier of the input/output processing process and an identifier of the corresponding processing process. As a managing method, for example, a method is used in which the information is stored on a management table and the table is stored. On the management table, for example, the processing process, the identifier of the processing process or the identifier of the process group of the processing process, the input/output processing process, and the identifier of the input/output processing process are correlated.

The input/output processing process managing unit 180 refers to the input/output specification information storage unit 151 and monitors the cache use situation with regard to the input/output processing process. On the other hand; when the processing process whose processing has been ended is generated, the end information is received from the OS and stored while correlated to the processing process on the management table. Then, the input/output processing process managing unit 180 executes the following operations, based on the cache use situation with regard to the input/output processing process stored on the management table and the end situation of the processing process. That is, when the processing process serving as the pair is ended and there is not the cache use with regard to the input/output processing processor when the processing process serving as the pair is ended and there is not the updated cache use with regard to the input/output processing process, the input/output processing process is ended.

Incidentally, the generation of the processing process whose processing has been ended can be also judged by referring to the correspondence table possessed by the cache managing unit 150.

The cache managing unit 150 includes an input/output specification information storage unit 151, in addition to the cache managing function possessed by the conventional cache managing mechanism 1320 (FIG. 1).

The input/output specification information storage unit 151 correlates the cache area information and the input/output specification information and stores them, similarly to the input/output specification information storage unit 111. Here, as the input/output specification information, the identifier of the input/output processing process can be also stored instead of the identifier of the processing process. When the identifier of the input/output processing process is stored, the cache managing unit 150 asks the input/output processing process managing unit 180 about the identifier of the input/output processing process for the identifier of the processing process.

The input/output processing process selecting unit 160 selects the input/output process suitable for the data output request from the write-back unit 120. The input/output processing process selecting unit 160, when receiving the data output request from the write-back unit 120, refers to the input/output specification information storage unit 151 and detects main input/output specification information of the cache area included in the data output request. Then, based on the input/output specification information, referring to the management table of the input/output processing process managing unit 180, the input/output processing process selecting unit 160 makes the input/output processing process corresponding to the input/output specification information operate, and makes the input/output processing process issue the data output request.

As the detection of the main input/output specification information, for example, it is possible to select the input/output specification information having the highest rate of the total capacity for the output cache area. As another example of the main input/output specification information detection, it is possible to select the input/output specification information, which has the highest input/output priority, namely, has the highest priority, for the output cache area. As another example of the main input/output specification information detection, it is possible to select the input/output specification information for the cache area that is finally updated for the output cache area. With the detection of the input/output specification information as mentioned above, it is possible to attain the output request in which the priority and the like are considered.

The input/output processing process selecting unit 160, when storing the identifier of the input/output processing process as the input/output specification information, detects the main input/output specification information from the identifier of the stored input/output processing process without referring to the input/output specification information storage unit 151.

The input/output processing process selecting unit 160, in the data input request, when issuing the data input request from the external storage apparatus after the new cache allocation, similarly detects the input/output specification information of the cache area included in the data input request from the input/output specification information storage unit 151, makes the corresponding input/output processing process operate, and then makes the input/output processing process issue the data output request. When the identifier of the input/output processing process is stored as the input/output specification information, the detection processing from the input/output specification information storage unit 151 is omitted.

The above series of the functions can generate one input/output processing process for the process group of the processing processes and correlate them to execute a processing, instead of the pair of the usual processing process and the input/output processing processes. That is, the input/output processing process generating unit 171 generates the input/output processing process for generating the process group, and further correlates the process group of the processing processes and the input/output processing process.

The input/output processing process managing unit 180 monitors the correspondence relation between the process group and the input/output processing process, and simultaneously carries out an ending judgment of the input/output processing process for the process group. The input/output specification information storage unit 151 can store it as the identifier of the process group instead of the identifier of the processing process.

In this way, the input/output processing process selecting unit 160 can be deemed as the input/output specifying unit 100 that specifies the information (the generation source of the original source of the data output request) with regard to the input/output related to the data area of the data which is a target for the generated output request, by referring to the input/output specification information storage unit 151. Also, the input/output scheduling unit 300 can be deemed as the input/output request processing unit 101 that obtains the information with regard to the specified input/output and executes the processing related to the request of the input/output.

An operation of the output control system (the input/output control method and the input/output control program) in the fourth exemplary embodiment of the present invention will be described below with reference to FIGS. 12 to 16. Here, FIGS. 13 to 16 are flowcharts showing operations of the output control system in the fourth exemplary embodiment of the present invention.

The operation in this exemplary embodiment differs in a portion for requesting the input/output to the external storage apparatus in the second exemplary embodiment, namely, the input request processing shown in the flowchart in FIG. 6 and the write-back processing shown in the flowchart in FIG. 8. Further, the operation in this exemplary embodiment differs in an addition of an input/output processing process generation processing. The operations in the output request processing are equal to those of the second exemplary embodiment. Thus, their explanations are omitted.

Figure 13:
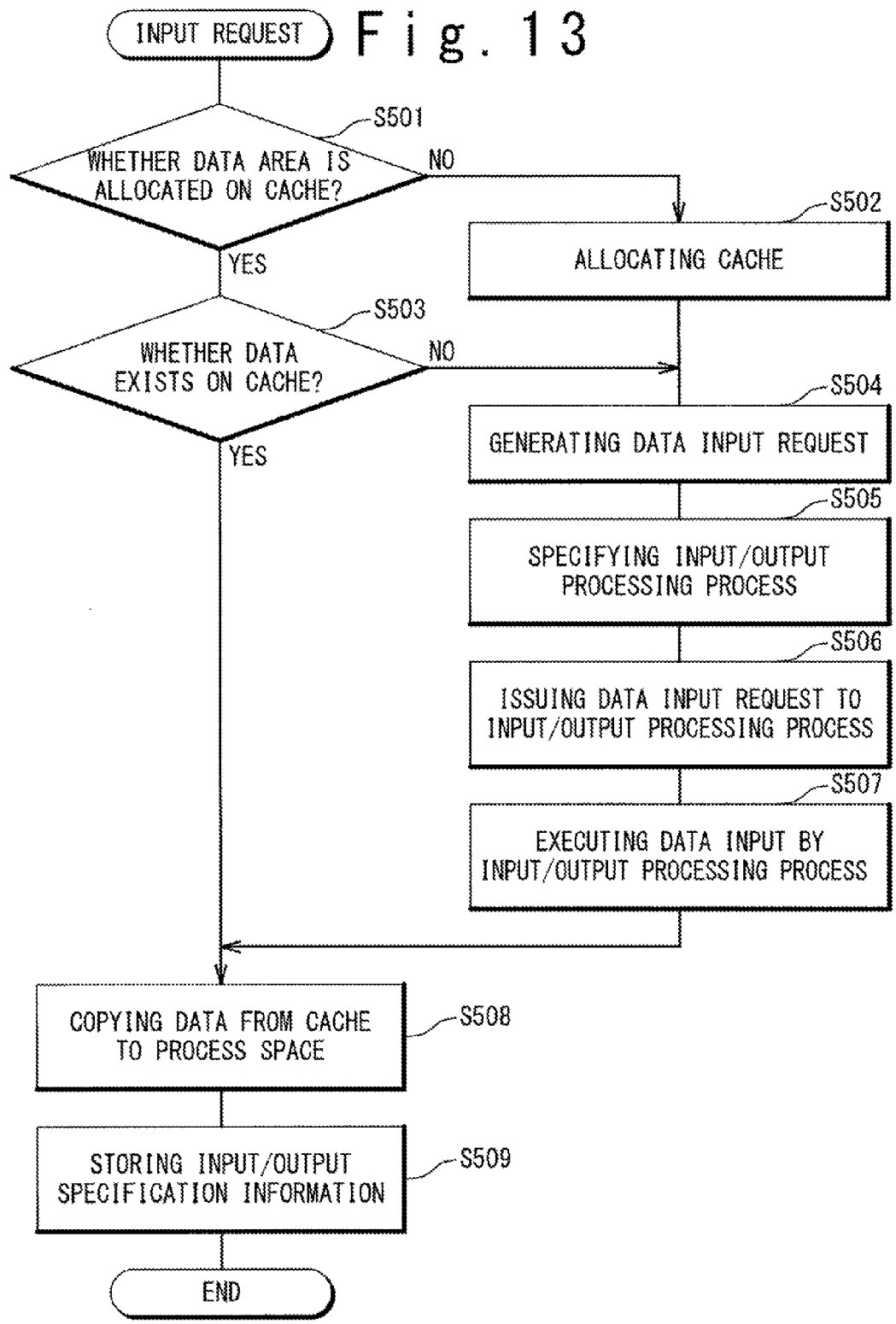
FIG. 13 is a flowchart showing an operation of the fourth exemplary embodiment of the output control system of the present invention.

An operation for the data input request from the processing process will be described below with reference to FIG. 13.

When the data input request is issued from the input/output requesting unit 200 in the processing process, the cache managing unit 150 checks whether or not a requested data area is already allocated (Step S501).

At the step S501, if the data area is not yet allocated on a cache (Step S501: NO), the cache managing unit 150 allocate a new cache area from an empty memory area and registers as the data area in the cache management information (e.g.: correspondence table (mapping table)) (Step S502).

At the step S501, if the data area is already allocated on the cache (Step S501: YES), the cache managing unit 150 checks whether or not data already exists on the cache (Step S503).

At the step S503, if the data does not exist on the cache corresponding to the data area (Step S503: NO), or if the new cache area is allocated at the step S502, in order to transfer the data to the cache area, the cache managing unit 150 generates a data input request to the external output apparatus and issues it to the input/output processing process selecting unit 160 (Step S504).

The input/output processing process selecting unit 160, when receiving the data input request to the external output apparatus, asks the input/output processing process managing unit 180 about the identifier of the corresponding input/output processing process, based on the identifier of the processing process (Step S505).

The input/output processing process managing unit 180 refers to the management table and replies the identifier of the input/output processing process corresponding to the identifier of the processing process, to the input/output processing process selecting unit 160. The input/output processing process selecting unit 160 issues a data input request to the external output apparatus, to the input/output processing process identified by the identifier of the input/output processing process replied from the input/output processing process managing unit 180 (Step S506).

The input/output processing process issues the received data input request to the external output apparatus as a data input request from itself. Consequently, the input/output request scheduling unit 300 executes the input processing as the input request executed by the input/output processing process. At that time, since the input/output processing process corresponds to a predetermined processing process, the input/output request scheduling unit 300 can execute the input control based on the priority and the like corresponding to the predetermined processing process. After that, until arrival of a response of data transmission ending from the external output through the input/output request scheduling unit 300, the operational flow is in the waiting state (Step S507).

At the step S503, if the data exists on the cache corresponding to the data area (Step S503: YES), or if the data transmission to the cache is completed at the step S507, the cache managing unit 150 transfers the data from the cache to the process space (Step S508).

The cache managing unit 150 stores the cache area and the input/output specification information through the input/output specification information storage unit 151. When the identifier of the input/output processing process is stored as the input/output specification information, the same processing as the step S505 is carried out to convert into the identifier of the input/output processing process (Step S509).

As mentioned above, the input processing of the data is completed.

Figure 14:
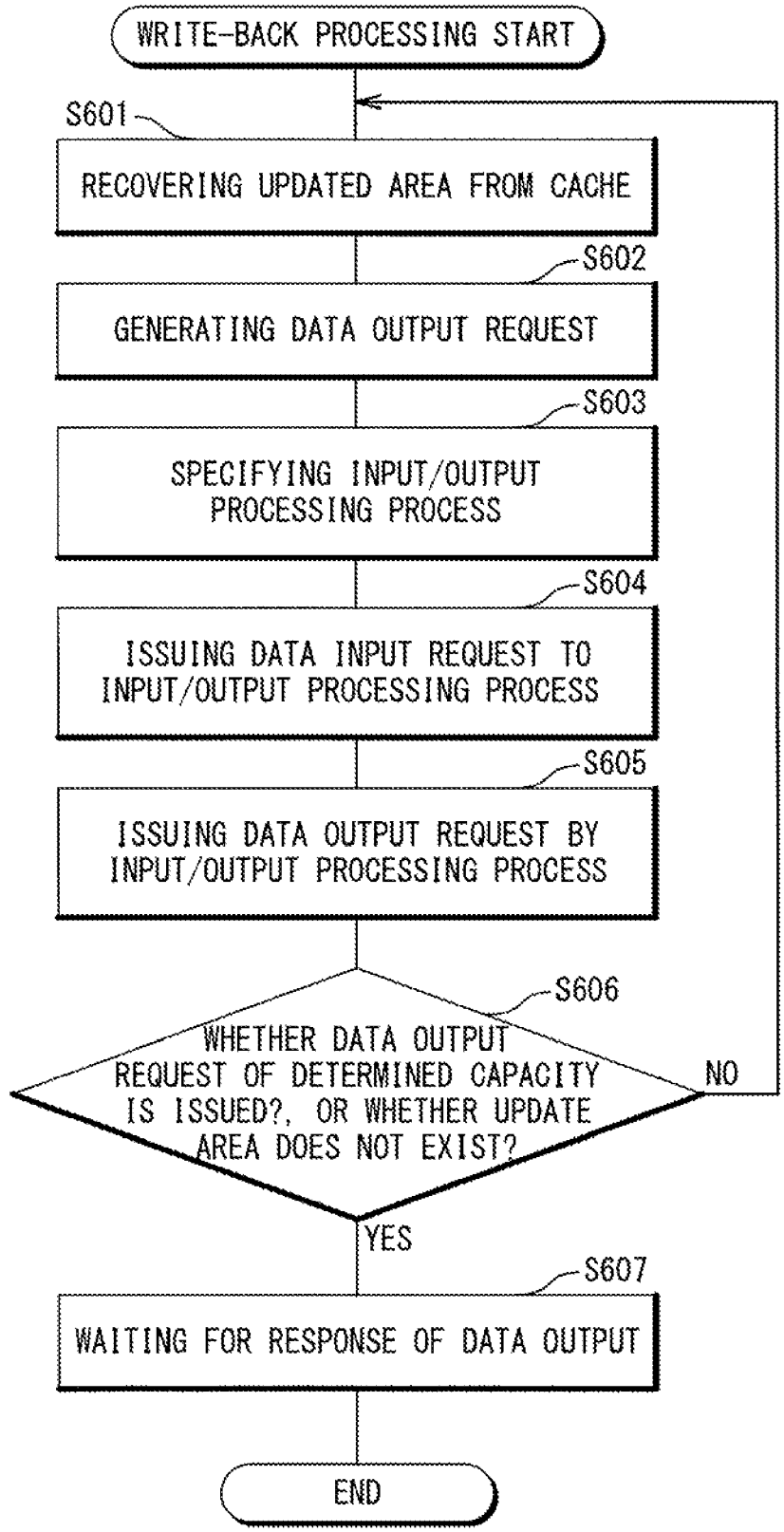
FIG. 14 is a flowchart showing an operation of the fourth exemplary embodiment of the output control system of the present invention.

An operation of a write-back processing for reflecting an update data on a cache to the external storage apparatus will be described below with reference to FIG. 14.

At a trigger of a write-back processing request as the timing, the write-back unit 120 is activated (Flowchart Start).

The write-back unit 120 refers to the management information of the cache managing unit 150 and recovers a data area to be updated from a cache, based on the foregoing various policies (Step S601). The write-back unit 120 generates a data output request to the recovered cache area and issues it to the input/output processing process selecting unit 160 (Step S602).

The input/output processing process selecting unit 160 refers to the information of the input/output specification information storage unit 151, for the received data output request, and specifies the main processing process for the data output request. Then, based on the identifier of the processing process, the identifier of the corresponding input/output processing process is asked to the input/output processing process managing unit 180. The input/output processing process managing unit 180 refers to the management table and replies the identifier of the input/output processing process corresponding to the identifier of the processing process, to the input/output processing process selecting unit 160. On the other hand, when the identifier of the input/output processing process is stored as the input/output specification information, the input/output processing process selecting unit 160 refers to the information of the input/output specification information storage unit 151 to determine the main input/output processing process (Step S603).

The input/output processing process selecting unit 160 issues a data output request for the external output apparatus, to the input/output processing process identified by the identifier of the replied or determined input/output processing process (Step S604).

The input/output processing process issues the received data input request for the external output apparatus, as an output request from itself (Step S605). Consequently, the input/output request scheduling unit 300 executes an output processing as the output request executed by the input/output processing process. At that time, since the input/output processing process corresponds to a predetermined processing process, the input/output request scheduling unit 300 can execute output control based on the priority and the like corresponding to the predetermined processing process.

The write-back unit 120 and the input/output processing process selecting unit 160 execute the steps S601 to 5605. If the data output request from the cache is not executed correspondingly to the firstly-determined capacity (Step S606: NO), again, a data reflection condition to the external output apparatus is changed by changing the retrieving range, changing the various parameters and the like. Then, the steps S301 to 5305 are repeated.

At the step S606, if the data output request from the cache of the determined capacity is executed, if the update data is not on the cache, or if the retrieval of the cache area is executed up to the certain number of times (Step S606: YES), the repetition is ended.

Finally, the write-back unit 120 waits for a response of the external storage apparatus for the data output, and clears the update flag (Step S607).

As mentioned above, the write-back processing for reflecting the update data on the cache to the external storage apparatus is completed.

Figure 15:
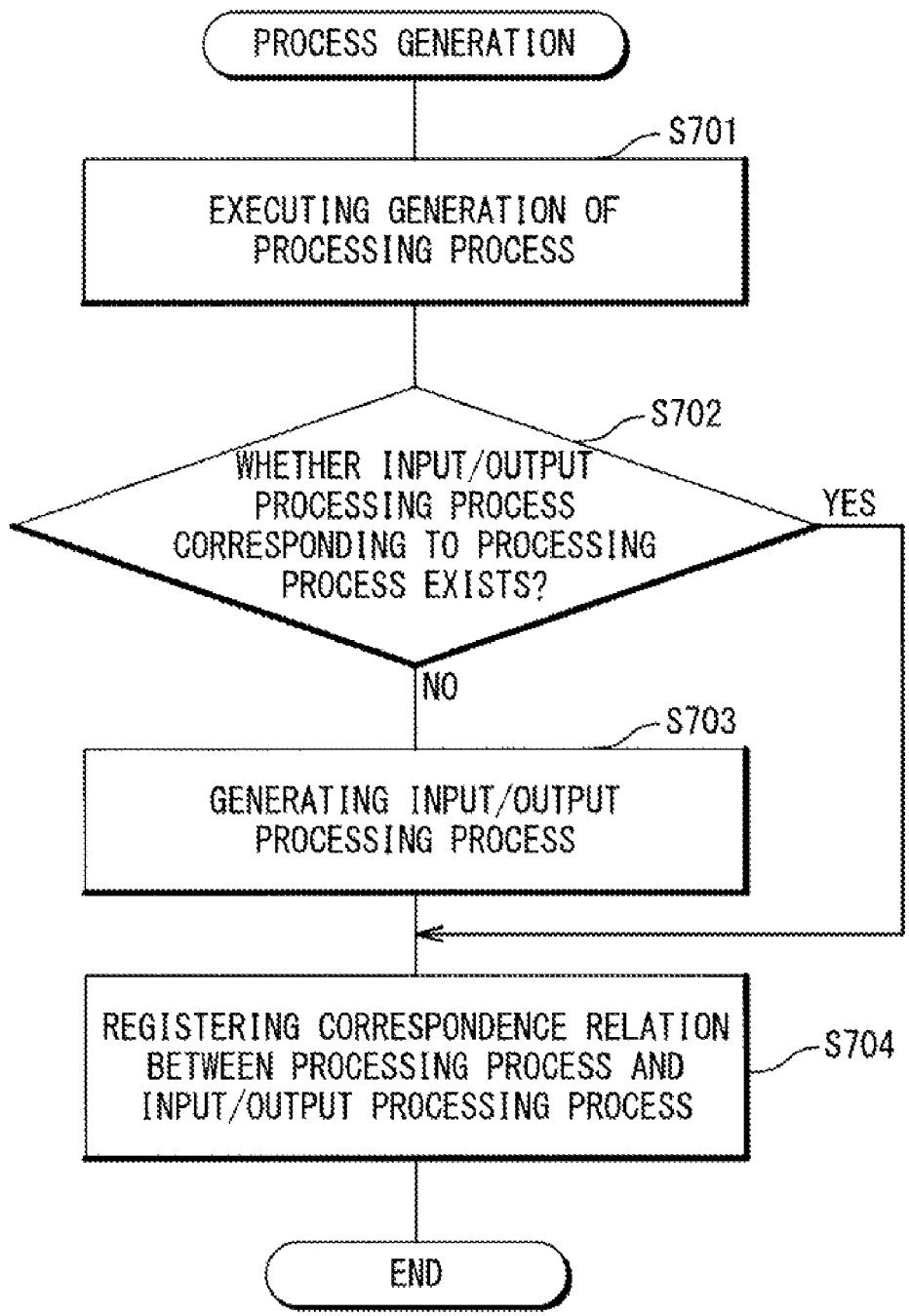
FIG. 15 is a flowchart showing an operation of the fourth exemplary embodiment of the output control system of the present invention.

An operation of process generation will be described below with reference to FIG. 15.

The process generating unit 170, when receiving a process generation system call, for example, from an application, executes an existing process generation processing, namely, generation of a processing process (Step S701).

The process generating unit 170 calls the input/output processing process generating unit 171 and enters input/output processing process generation. The input/output processing process generating unit 171 checks whether or not an input/output processing process serving as a pair with the generated processing process is generated (Step S702). This may occur when the input/output processing process is generated for each process group. Because one input/output processing process is generated for the plurality of the processing processes. When the input/output processing process serving as the pair with the processing process is always generated, the step S702 may be omitted.

If the input/output processing process serving as the pair is not generated (Step S702: NO), the input/output processing process generating unit 171 generates the input/output processing process (Step S703).

The input/output processing process generating unit 171 issues identification information of the input/output processing process, which serves as the pair with the processing process, to the input/output processing process managing unit 180. Then, the input/output processing process managing unit 180 records the correspondence relation between the processing process and the identification information of the input/output processing process serving as the pair (Step S704).

As mentioned above, the process generation processing is completed.

Figure 16:
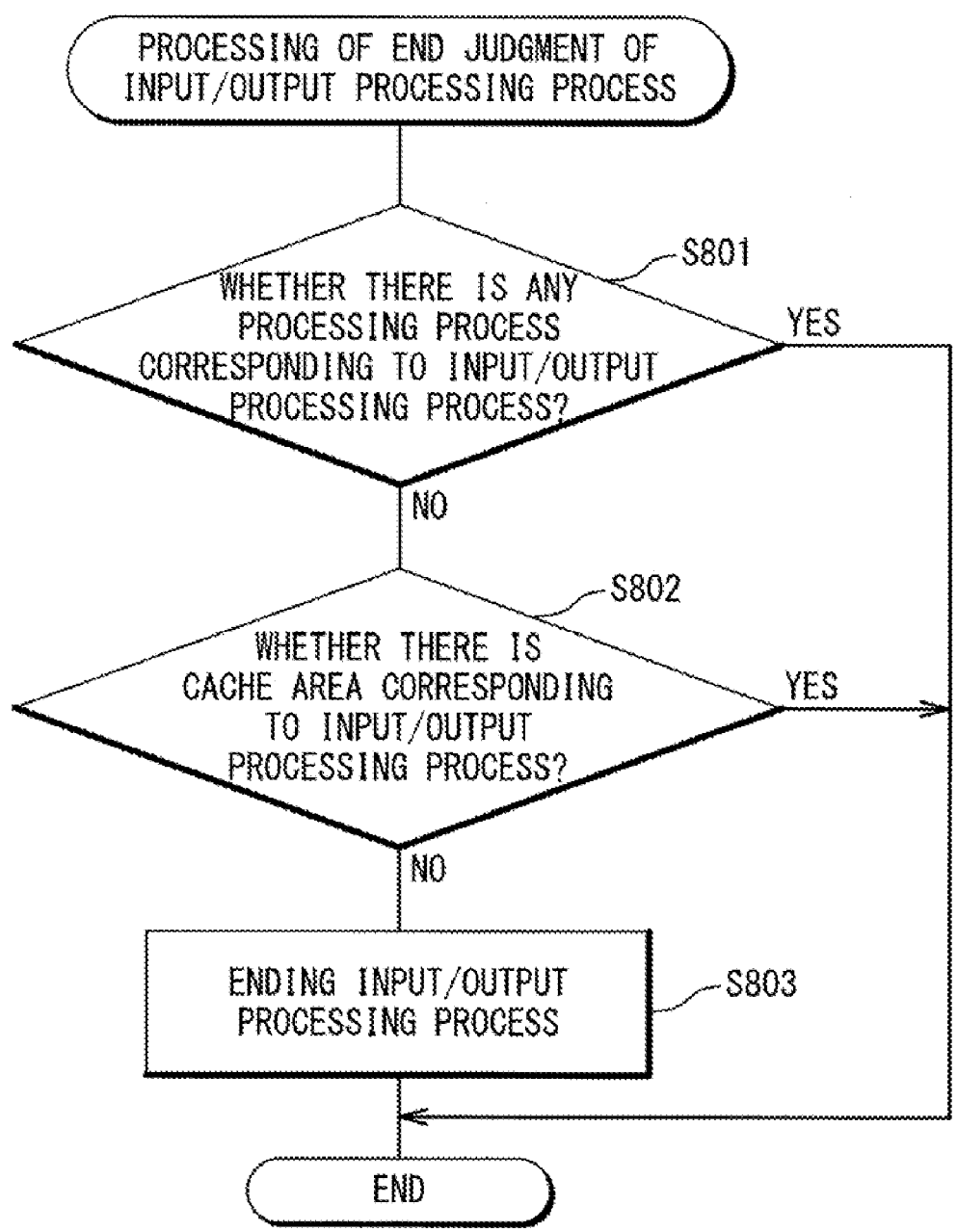
FIG. 16 is a flowchart showing an operation of the fourth exemplary embodiment of the output control system of the present invention.

An end judgment of the input/output processing process and an operation of the ending will be described below with reference to FIG. 16.

The ending judgment of the input/output processing process is operated when any event occurs. An example of an occurrence event includes a time interval, change of the input/output specification information, change of the cache information, ending of the processing process, and the like. At a trigger of the event occurrence, the input/output processing process managing unit 180 checks whether or not there is any processing process which serves as a pair with the input/output processing process, from the management table (Step S801).

If there is not any processing process serving as the pair at all, the input/output processing process managing unit 180 checks whether or not there is a cache area having a relation to the input/output processing process, from the correspondence table (Step S802). The cache area having the relation implies, for example, the cache area in which an input/output request is executed by the processing process serving as the pair with the input/output processing process. An other example of the cache area having the relation includes an area in which update data is held in the cache area where the input/output request is executed by the processing process serving as the pair with the input/output processing process.

If there is not any processing process serving as the pair at all and if there is not any cache area having the relation, the input/output processing process is ended (Step S803).

At the step S801 and the step S802, if there is a processing process serving as the pair, or if there is a cache area having the relation, nothing is executed.

As mentioned above, the end judgment of the input/output processing process and the ending processing are completed.

The effects of this exemplary embodiment will be described below.

In this exemplary embodiment, the process for the input/output processing corresponding to the processing process is explicitly generated, and the command is always issued by the process for the input/output processing. Thus, it is possible to transmit certain input/output specification information for the process to the input/output scheduling unit 300. Consequently, even in the input/output using the cache, it is possible to provide the function of the set input/output scheduling, and it is possible to avoid the performance drop and the responsibility drop.

Moreover, as the additional effect, since the process information and the like are not changed for the input/output processing, it is possible to ensure the operations under the regular process information management. For example, it is not required to change the identifier of the process, and it is not required to change the information obtainment API of the input/output scheduling unit. Thus, the regular management of the identifier of the process can be attained in the non-modified input/output scheduling unit under it.

Even in the fourth exemplary embodiment, as enlarged to the third exemplary embodiment from the second exemplary embodiment, the second exemplary embodiment can be applied. That is, by introducing the cache reserving unit 142 to the third exemplary embodiment, it is possible to determine whether or not the cache area can be allocated.

In the second to fourth exemplary embodiments, as the input/output request processing unit 101, the input/output scheduling unit 300 is exemplified and described. However, as the input/output request processing unit 101, it is possible to use an input/output request managing unit that monitors and controls the input/output.

As an example of a case in which the input/output request managing unit monitors input/output, it can be operated as an input/output monitoring unit that roles as the function of a monitor. For example, the number of inputs/outputs for each process, process group, input/output priority or external storage apparatus, input/output data quantity and throughput can be monitored and measured as statistic data. Also in this case, by using the functions of the input/output specification information storage units 111, 151 and the input/output specification information restoring unit 130, or the input/output processing process selecting unit 160 of the present invention, it is possible to correctly specify the process of the original source or the corresponding input/output process, and it is possible to identify the input/output for each process.

As an example of a case in which the input/output request manager controls the input/output, it can be operated as an input/output access control unit for determining whether or not a processing of an input/output request is executed. For example, from the relation between the process or the process group and the external storage apparatus, whether or not an access is executed can be determined based on judgment of a normal operation or abnormal operation. Also in this case, by using the functions of the input/output specification information storage units 111, 151 and the input/output specification information restoring unit 130 or the input/output processing process selecting unit 160 of the present invention, it is possible to correctly specify the process of the original source or the corresponding input/output process, and it is possible to identify the input/output for each process.

SPECIFIC EXAMPLE 1

Figure 17:
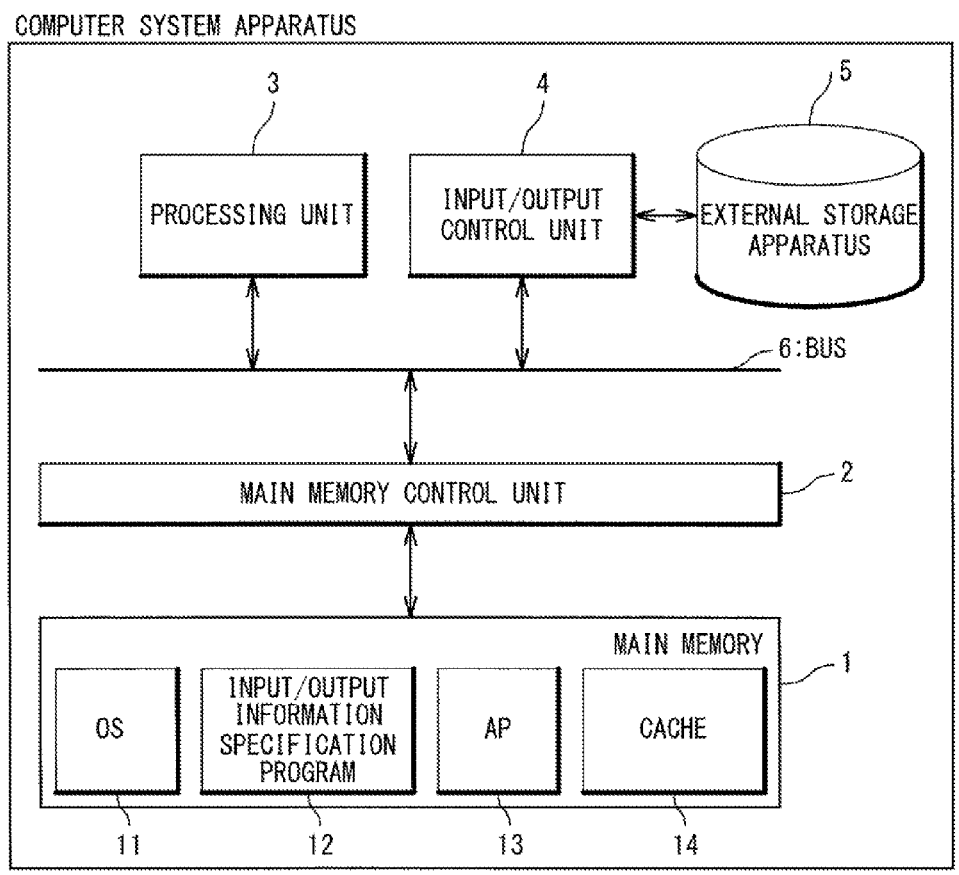
FIG. 17 is a block diagram showing a first specific example of a calculating system apparatus as the input/output control system of the present invention.

The first specific example of the present invention will be described below. FIG. 17 is a block diagram showing the specific example of a computer system apparatus serving as the input/output control system of the present invention. The computer system apparatus serving as the input/output control system includes a main memory 1, a main memory control unit 2, a processing unit 3, an input/output control unit 4, an external storage apparatus 5 and a bus 6.

The cache managing unit 110, the write-back unit 120 and the output specification information restoring unit 130 in the second exemplary embodiment, and the cache managing unit 140, the write-back unit 120 and the input/output specification information restoring unit 130 in the third exemplary embodiment, and the cache managing unit 150, the write-back unit 120, the input/output processing process selecting unit 160, the process generating unit 170 and the input/output processing process managing unit 180 in the fourth exemplary embodiment are stored as an input/output information specification program 12, for example, in an external storage apparatus 5. Then, the input/output information specification program 12 is read from the external storage apparatus 5 at the time of an operation and installed onto the main memory 1 and then executed by the processing unit 3.

An operating system (OS) 11 and several processes (AP) 13, which are basic programs for operating the computer system apparatus, are stored, for example, in the external storage apparatus 5. Then, those OS 11 and AP 13 are read at the time of an operation and installed onto the main memory 1 and then executed by the processing unit 3. Here, the input/output requesting unit 200 is possessed by the AP 13.

A cache 14 is allocated and used as a cache area in an unused area of the main memory 1.

The input/output information specification process 12 manages and monitors the input/output information, in the input/output using the cache 14, based on the operations in the flowcharts in FIGS. 6 to 8, 10, or, 13 to 16, and transmits the input/output specification information to the input/output scheduling unit 300.

Here, on the drawing, the OS 11 and the input/output information specification program 12 are separated. However, the input/output information specification program 12 may be installed inside the OS 11 and operated integrally with the OS 11.

In the first to fourth exemplary embodiments, the input/output scheduling unit 300 can be embodied, for example, as one function of the OS 11. The input/output scheduling unit 300 is operated to carry out the change, integration and division of the request order, based on the input/output specification information, for the data input/output request to the external storage apparatus and consequently improve the throughput and the responsibility. Based on the changed order, the input/output request is issued through the input/output control unit 4, and the input/output is performed on the external storage apparatus 5.

Also, as another example, the input/output scheduling unit 300 can be embodied as the function of the input/output control unit 4. The input/output control unit 4 is operated to carry out the change, integration and division of the final request order based on the input/output specification information, and consequently improve the throughput and the responsibility.

Figure 18:
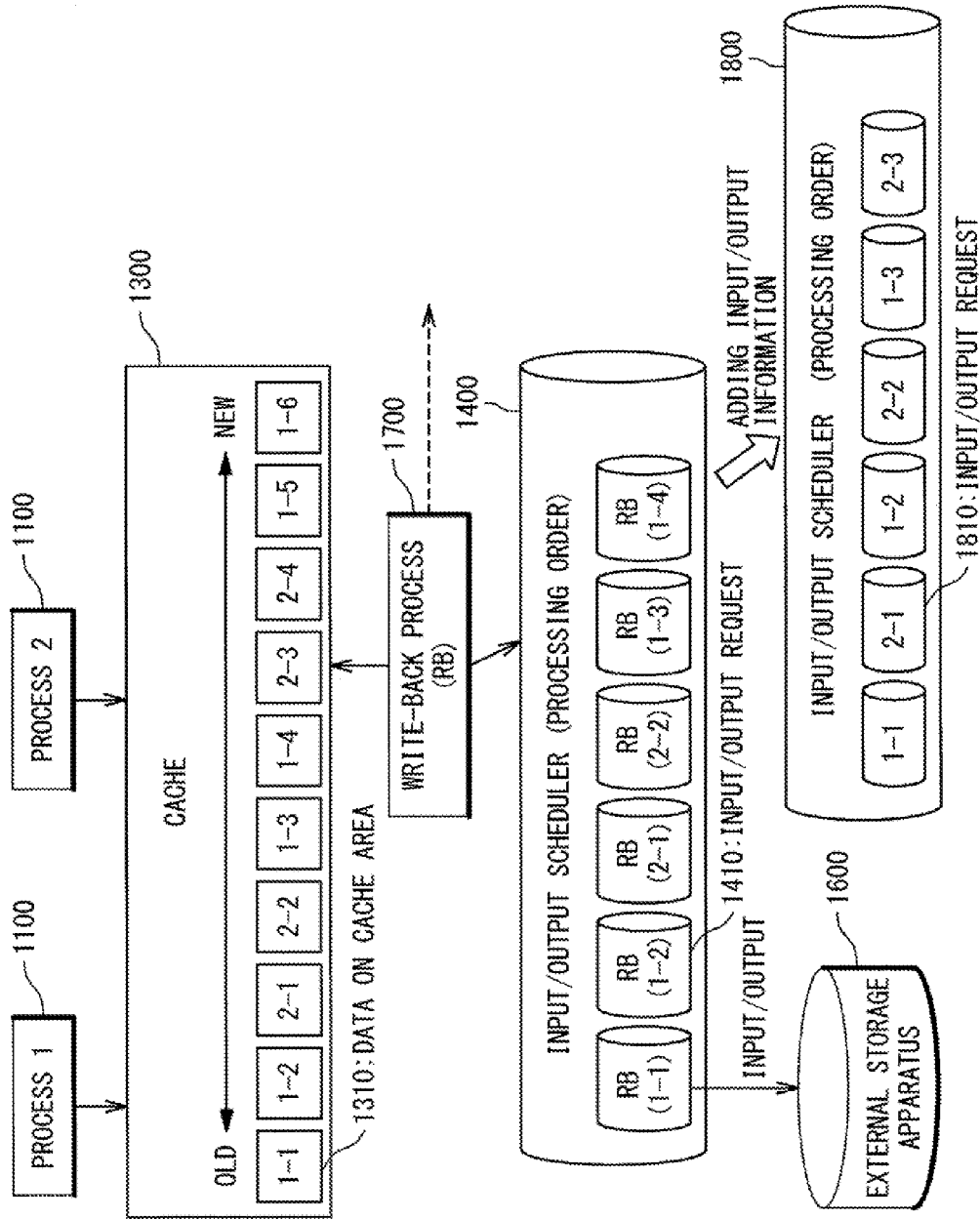
FIG. 18 is a conceptual view describing input/output using a cache in the present invention.

An example of a difference between the reception of the conventional input/output request and the reception of the input/output request in the specific example of the present invention will be described below with reference to the drawings. FIG. 18 is a conceptual view describing input/output using a cache in the present invention.

In the example shown in FIG. 18, the representation of the data input/output request uses the representation of "x-y", "RB(x-y)" similarly to the case in FIG. 1. Also, the input/output schedulers 1400, 1800 are attained as the functions of the OS 11 and uniformly execute a processing for each request per process. Moreover, the cache 1300 and the external storage apparatus 1600 correspond to the cache 14 and the external storage apparatus 5, respectively.

Moreover, as the method of the write-back, the method is employed in which the older accessed data is firstly executed. Also, in order to simplify the explanation, the input/output of each process is executed in only the writing, and each time the process is switched, the writing is assumed to request two-request value.

It is started from the process 1, and the two-request value ("1-1", "1-2") is written to the cache 1300. In succession, it is switched to the process 2, and the two-request value ("2-1", "2-2") is written to the cache 1300. This is repeated, and the cache area is used such as the cache 1300 shown in FIG. 18.

On the contrary, the write-back unit 120 is operated as a write-back process (RB) 1700 and executes the write-back in an order starting with the older element, namely, the left end ("1-1") of the cache. That is, the data output request to the external storage apparatus 1700 of the cache area "1-1" is generated and issued to the input/output scheduler unit 300.

Here, in the conventional issuing method of the input/output request, in the input/output scheduler 1400, all are judged to be the data output request from the write-back process, namely, all are judged to be the data output request from the same process. That is, because of the data output request from the same process, the change caused by the scheduling is not generated. Then, as for the processing order inside the input/output scheduler, every two-request value is processed per process, as indicated in the input/output request sequence 1410 inside the input/output scheduler 1400 shown in FIG. 18. This does not satisfy that the uniform processing is executed for each request per process, and is different from the original policy of the input/output scheduler.

When the present invention is applied, the information for identifying the process is transmitted as the input/output specification information. Thus, the data output request issued as "RB(x-y)" is transmitted as the data output request from an original process x. For this reason, in such a way that the processing is uniformly executed in each process, the order is changed by the input/output scheduler. Then, as indicated in the input/output request sequence 1810 inside the input/output scheduler 1800 in FIG. 18, the processing can be executed every one-request value per process. Thus, it can be operated based on the original policy of the input/output scheduler.

In the fourth exemplary embodiment, the information of the input/output request is not changed to the original process identifier, and this is only changed to the request from the input/output processing process serving as the pair. For example, in a case that an input/output processing process 3 is generated for the process 1 and that an input/output processing process 4 is generated for the process 2, when an input/output processing process z issues the data request corresponding to the y-th component of the process x is represented as "z (x-y)", the processing order of the input/output scheduler 1800 is represented as "3(1-1), 4(2-1), 3(1-2), 4(2-2), - - - ".

Even if the area is limited in the cache capacity, the similar fact can be said.

Even if the cache area is limited, the data output requests are outputted from the write-back process. At the stage of the input/output scheduler, the fact that they are unified and processed in turn is not changed. Thus, this has great influence on the operation of the write-back process and the scheduling. That is, the initial writing to the limited cache area leads to the prevention of the performance drop in the cache allocation problem, because the area is unused as the cache. However, from the situation in which the cache area is exhausted, all involve the input/output from/to the external storage apparatus. The data output requests are unified and operated by the write-back process. Thus, unless the input/output scheduler executes the already-held output request to the other process, it is impossible to respond to a new output request. For this reason, it leads to the performance drop and the responsibility drop, similarly to the cache. On the contrary, when the present invention is applied, it is possible to avoid the influence from the other process at the time of the cache area allocation caused by the cache limit in the conventional technique. Simultaneously, it is possible to prevent the influence from the other process in the input/output scheduler.

SPECIFIC EXAMPLE 2

The present invention can be attained even in a computer system in which, when there are two kinds of storage apparatuses whose speeds are different, the fast storage apparatus is used as a cache, and the input/output from/to the slow storage apparatus is made faster. For example, it is possible to exemplify a case of using an USB memory, a flash memory or the like as the fast storage apparatus and using them as a cache for the slow storage apparatus such as an HDD or DVD apparatus. This case corresponds to the configuration in which in the first specific example, the cache area allocated on the main memory is allocated on the fast storage apparatus.

Figure 19:
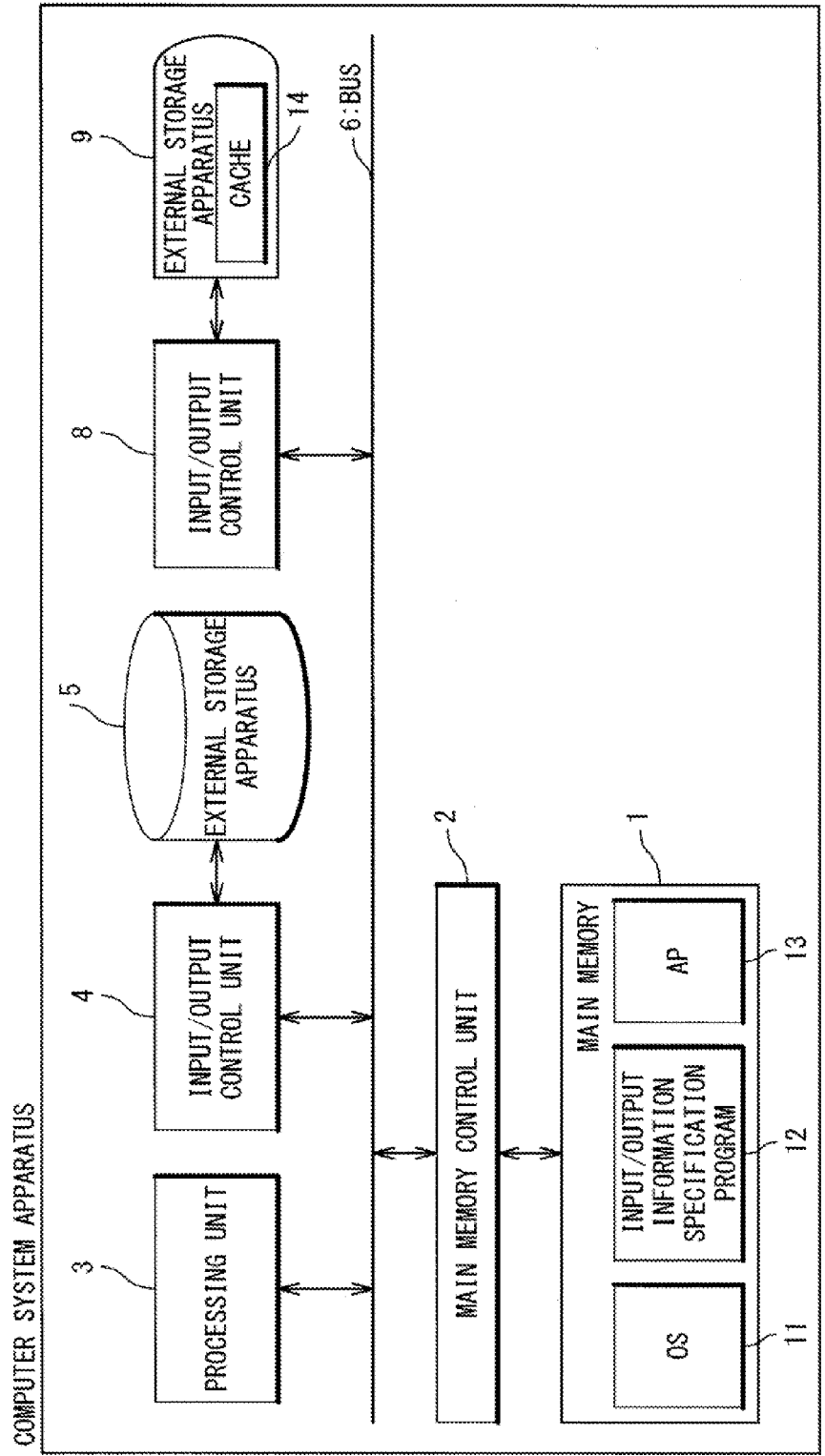
FIG. 19 is a block diagram showing a second specific example of a calculating system apparatus as the input/output control system of the present invention.

The second specific example will be described below with reference to FIG. 19. FIG. 19 is a block diagram showing the computer system apparatus as the input/output control system in the second specific example of the present invention. The computer system apparatus as the input/output control system includes a main memory 1, a main memory control unit 2, a processing unit 3, a slow external storage apparatus 5, an input/output control unit 4 for the slow external storage apparatus 5, a fast external storage apparatus 9, an input/output control unit 8 for the fast external storage apparatus 9, and the bus 6.

The cache managing unit 110, the write-back unit 120 and the input/output specification information restoring unit 130 in the second exemplary embodiment, the cache managing unit 140, the write-back unit 120 and the input/output specification information restoring unit 130 in the third exemplary embodiment, and the cache managing unit 150, the write-back unit 120, the input/output processing process selecting unit 160, the process generating unit 170 and the input/output processing process managing unit 180 in the fourth exemplary embodiment are expanded as the input/output information specification program 12 onto the main memory 1 and executed by the processing unit 3. Here, the AP 13 has the input/output requesting unit 200.

The cache 14 is allocated in the fast external storage apparatus 9 and used as a cache area.

When the process (AP) 13 requests the input/output from/to the slow external storage apparatus 5, the input/output information specification process 12 manages and monitors the input/output information, in the input/output using the cache 14, based on the operations of the flowcharts in FIGS. 6 to 8, 10, or 13 to 16, and then transmits the input/output information to the input/output scheduling unit 300.

Also, in FIG. 19, between the main memory 1 and the fast external storage apparatus 9, it is possible to embody the faster input/output using the cache. That is, it is possible to establish a multi-stage cache mechanism. Even in such a case, the ideas similar to the first specific example are embodied between the main memory 1 and the fast external storage apparatus 9, and the second specific example is attained between the fast external storage apparatus 9 and the slow external storage apparatus 5. Consequently, by transmitting the input/output specification information, the various input/output scheduling units 300 controlling the respective inputs/outputs can control the input/output.

Similarly, in a computer system in which there are a plurality of storage apparatuses whose speeds are different, and the faster storage apparatus is used as a cache for making a speed of the input/output of the slower storage apparatus faster, the present invention can be applied to the respective cache managing mechanisms.

Figure 20:
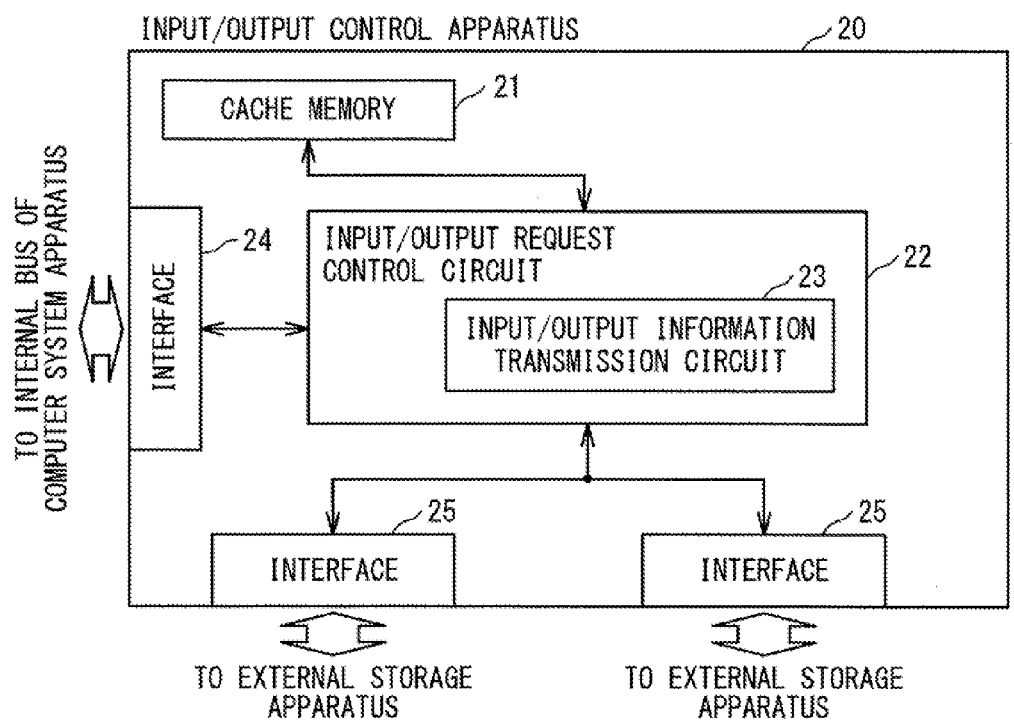
FIG. 20 is a block diagram showing an application example of the second specific example of the calculating system apparatus as the input/output control system of the present invention.

Also, the first to third exemplary embodiments of the present invention can be attained inside the input/output control apparatus 4 in FIG. 17. For example, it can be attained in an IDE control chip, an SCSI card, an RAID card or the like. For example, as shown in FIG. 20, an input/output control apparatus 20 corresponding to the input/output control apparatus 4 in FIG. 17 includes a cache memory 21, an input/output request control circuit 22, an input/output specification information transmission circuit 23, an interface 24 connected to the bus of the computer system, and interfaces 25 connected to the bus of the computer system.

The cache memory 21 is a storage apparatus in which the fast input/output is possible. For example, this is attained by using a NAND flash memory and the like. This serves as a temporally-held place of the input/output. The input/output request control circuit 22 issues an input/output request, which is transmitted through the interface 24 from the bus of the computer system, through the interface 25 to the corresponding external storage apparatus. At this time, the cache memory 21 is used as a cache area, and the faster speed of the input/output is attained. In the RAID card and the like, one input/output request is issued to a plurality of corresponding external storage apparatuses at the same time, and the inputs/outputs from/to the external storage apparatuses are made parallel, thereby making the speed faster. Also at this time, the cache memory 21 is used as the temporally stored place.

The input/output specification information transmission circuit, which attains the cache managing unit 110, the write-back unit 120 and the input/output specification information restoring unit 130 in the second exemplary embodiment of the present invention, and the cache managing unit 140, the write-back unit 120 and the input/output specification information restoring unit 130 in the third exemplary embodiment, is assembled in the input/output request control circuit 22. Consequently, the input/output request control circuit 22 transmits the input/output specification information to the input/output scheduling unit 300, based on the operations of the flowcharts in FIGS. 6 to 8, or 10.

As an attaining method of the circuit, for example, an input/output storage circuit that stores the input/output specification information by using RAM and an input/output information transmission circuit that attains the operations of the flowcharts in the present invention can be attained by using electric elements. They are designed as a system LSI and assembled into one chip, and this can be attained.

Also, as another attaining method of the circuit, it can be attained by using a programmable LSI and programming a program in which the flowcharts of the present invention are operated and a storage space for storing the input/output specification information. For example, FPGA (Field Programmable Gate Array) and the like are listed.

The input/output scheduling unit 300 is assembled, for example, in an input/output request control circuit. Then, as for the input/output from/to the external storage apparatus that is requested through the interface 24 by the computer system, the request order can be changed based on the input/output specification information.

Also, as another example, it can be embodied as the function of the external storage apparatus 5.

Similarly, even in an external storage apparatus that has a cache memory and attains the faster speed of the input/output using the cache, the present invention can be embodied in the cache management circuit inside the external storage apparatus.

Similarly, in all of input/output apparatuses that use a storage medium as a transient storage place, the present invention can be embodied in the manager.

According to the present invention, this can be applied to the field such as a control apparatus of input/output when many processes are started in a personal computer (PC) or a terminal device. Also, in a virtual solution using a virtual computer technique and a thin client solution, this can be applied to the field such as a control apparatus of input/output of a client and each virtual computer. Also, this can be applied to the field such as an input/output control apparatus for controlling a plurality of external storage apparatuses such as RAID and the like.

The program in the present invention may be recorded in a storage medium that can be read by a computer and may be read from the storage medium to an information processing apparatus.

According to the present invention, in the input/output mechanism using a cache, the input/output scheduler can suitably execute the scheduling.

It is apparent that the present invention is not limited to the above embodiment, but may be modified and changed without departing from the scope and spirit of the invention.

This application is based upon and claims the benefit of priority from Japanese patent application No. 2007-149489 filed on Jun. 5, 2007, the disclosure of which is incorporated herein in its entirety by reference.

The invention claimed is

1. An input/output control system of an information processing apparatus that includes a first storage portion and a second storage portion and carries out an input/output processing using a part or whole of said first storage portion as a cache area, said input/output control system comprising:
   a cache managing unit configured to store data, which is inputted from or outputted to said second storage portion, in said cache area;
   an input/output specification information storage unit configured to correlate a data area for said data stored in said cache area, and information with regard to input/output to store said correlated data area and information;
   a write-back unit configured to generate an output request of said data from said data area in said cache area to said second storage portion; and
   an input/output specifying unit configured to specify said information with regard to input/output correlated to said data area of said data which is a target for said generated output request, by referring to said input/output specification information storage unit, and transmits information with regard to input/output which cannot be specified due to an operation of said write-back unit to an input/output processing unit in said second storage portion,
   wherein said information with regard to input/output includes at least one of information specifying an issuing source of said input/output, and priority of said input/output which corresponds to said issuing source.

2. The input/output control system according to claim 1, wherein said input/output specifying unit includes:
   an input/output specification information restoring unit configured to restore said information with regard to input/output which cannot be specified due to an operation of said write-back unit by referring to said input/output specification information storage unit, based on said data area, in response to said output request,
   wherein said information with regard to input/output is transmitted after being restored.

3. The input/output control system according to claim 2, wherein a restoring method is realized by changing temporally said information with regard to input/output to said output request, or modifying said output request, at a time when obtaining information of a related processing unit.

4. The input/output control system according to claim 2, further comprising:
   an input/output request managing unit configured to manage said output request by referring to said restored information with regard to input/output,
   wherein said input/output specifying unit determines a processing for said output request based on said restored information with regard to input/output.

5. The input/output control system according to claim 4, wherein said input/output request managing unit contains at least one of functions including an input/output scheduling unit which schedules input/output, an input/output monitoring unit which monitors input/output and takes statistics, and an input/output access control unit which controls an access of input/output.

6. The input/output control system according to claim 2, wherein said write-back unit determines a data area where data is outputted from said cache area to said second storage portion by referring to said information with regard to input/output in said input/output specification information storage unit.

7. The input/output control system according to claim 1, wherein said information with regard to input/output includes at least one of information specifying one of a process and a process group issuing said input/output, and priority of said input/output which corresponds to said issuing process or process group.

8. The input/output control system according to claim 1, further comprising:
   an input/output processing process generating unit configured to be included in a process generating unit generating a process, and generate an input/output processing process in charge of issuing an input/output request for said process; and
   an input/output processing process managing unit configured to correlate said process and said input/output processing process and manage said process and said input/output processing process,
   wherein said input/output specifying unit includes:
   an input/output processing process selecting unit configured to select said input/output processing process corresponding to said process and said information with regard to input/output by referring to said input/output specification information storage unit and said input/output processing process managing unit, based on said data area, in response to said output request,
   wherein said information with regard to input/output is transmitted by correlating said information with regard to input/output with a corresponding input/output processing process by said selected input/output processing process issuing said output request.

9. The input/output control system according to claim 8, wherein
   said input/output processing process selecting unit further selects said input/output processing process corresponding to said process by referring to said input/output processing process managing unit, based on said data area, in response to an input request by said process, and
   wherein said information with regard to input/output is transmitted by correlating said information with regard to input/output with a corresponding input/output processing process by said selected input/output processing process issuing said output request.

10. The input/output control system according to claim 8, further comprising:
    an input/output request managing unit configured to manage said input/output request as a processing of said selected input/output processing process,
    wherein said input/output request managing unit is enabled to manage input/output of said input/output processing process indirectly as input/output of said process based on said correlation of said process and said input/output processing process.

11. The input/output control system according to claim 8, wherein said write-back unit determines a storage area for output from said cache area to said second storage portion by referring to said information with regard to input/output in said input/output specifying information storage unit.

12. The input/output control system according to claim 8, wherein said information with regard to input/output includes at least one of information specifying one of a process and a process group issuing said input/output, and priority of said input/output which corresponds to said issuing process or process group.

13. The input/output control system according to claim 7, wherein said information with regard to input/output further includes said second storage portion.

14. The input/output control system according to claim 12, wherein said information with regard to input/output further includes said second storage portion.

15. The input/output control system according to claim 8, wherein said information with regard to input/output includes information specifying a process issuing said input/output request.

16. The input/output control system according to claim 15, wherein said information with regard to input/output includes information specifying one of an input/output processing process and an input/output processing process group.

17. The input/output control system according to claim 2, wherein said cache managing unit determines whether or not a cache can be allocated for storing said data in said cache area by referring to said information with regard to input/output in said input/output specifying information storage unit.

18. An input/output control method of an information processing apparatus that includes a first storage portion and a second storage portion and carries out an input/output processing using a part or whole of said first storage portion as a cache area, said output control method comprising:
    storing data, which is inputted from or outputted to said second storage portion, in said cache area;
    correlating a data area for said data stored in said cache area, and information with regard to input/output to store said correlated data area and information in an input/output specification information storage unit;
    generating an output request of said data from said data area in said cache area to said second storage portion; and
    specifying said information with regard to input/output correlated to said data area of said data which is a target for said generated output request, by referring to said input/output specification information storage unit, and transmits information with regard to input/output which cannot be specified due to said step of generating said output request to a step of input/output processing in said second storage portion,
    wherein said information with regard to input/output includes at least one of information specifying an issuing source of said input/output, and priority of said input/output which corresponds to said issuing source.

19. The input/output control method according to claim 18, wherein said step of transmitting information with regard to input/output which cannot be specified due to said step of generating said output request to a step of input/output processing in said second storage portion, includes:
    restoring said information with regard to input/output which cannot be specified due to said step of generating said output request, by referring to said input/output specification information storage unit, based on said data area, in response to said output request,
    wherein said information with regard to input/output is transmitted after being restored.

20. The input/output control method according to claim 19, wherein a restoring method is realized by changing temporally said information with regard to input/output to said output request, or modifying said output request, at a time when obtaining information of a related processing unit.

21. The input/output control method according to claim 18, further comprising:
    managing said output request by referring to said restored information with regard to input/output,
    wherein said specifying step includes:
    determining a processing for said output request based on said restored information with regard to input/output.

22. The input/output control method according to claim 18, wherein said managing step contains at least one of steps of scheduling input/output, monitoring input/output and taking statistics, and controlling an access of input/output.

23. The input/output control method according to claim 18, wherein said generating step includes:
    determining a data area where data is outputted from said cache area to said second storage portion by referring to said information with regard to input/output in said input/output specification information storage unit.

24. The input/output control method according to claim 18, wherein said information with regard to input/output includes at least one of information specifying one of a process and a process group issuing said input/output, and priority of said input/output which corresponds to said issuing process or process group.

25. The input/output control method according to claim 18, further comprising:
    generating an input/output processing process in charge of issuing an input/output request for a process; and
    correlating said process and said input/output processing process and managing said process and said input/output processing process,
    wherein said step of transmitting information with regard to input/output which cannot be specified due to said step of generating said output request to a step of input/output processing in said second storage portion, includes:
    selecting said input/output processing process corresponding to said process and said information with regard to input/output by referring to said input/output specification information storage unit and information of said input/output processing process managing, based on said data area, in response to said output request, and
    said selected input/output processing process issuing said output request,
    wherein said information with regard to input/output is transmitted by correlating said information with regard to input/output with a corresponding input/output processing process by said selected input/output processing process issuing said output request.

26. The input/output control method according to claim 25, wherein said step of selecting said input/output processing process, includes:
    selecting said input/output processing process corresponding to said process by referring to said input/output processing process managing unit, based on said data area, in response to an input request by said process,
    wherein said input/output control method further comprising:
    said selected input/output processing process issuing said output request.

27. The input/output control method according to claim 25, further comprising:
    managing said input/output request as a processing of said selected input/output processing process,
    wherein said managing input/output request step includes:
    managing input/output of said input/output processing process indirectly as input/output of said process based on said correlation of said process and said input/output processing process.

28. The input/output control method according to claim 25, wherein said generating step includes:
    determining a storage area for output from said cache area to said second storage portion by referring to said information with regard to input/output in said input/output specifying information storage unit.

29. The input/output control method according to claim 25, wherein said information with regard to input/output includes at least one of information specifying one of a process and a process group issuing said input/output, and priority of said input/output which corresponds to said issuing process or process group.

30. The input/output control method according to claim 25, wherein said information with regard to input/output includes information specifying a process issuing said input/output request.

31. The input/output control method according to claim 30, wherein said information with regard to input/output includes information specifying one of an input/output processing process and an input/output processing process group.

32. The input/output control method according to claim 18, wherein said storing said data in said cache area includes:
  determining whether or not a cache can be allocated for storing said data in said cache area by referring to said information with regard to input/output in said input/output specifying information storage unit.

33. The input/output control method according to claim 24, wherein said information with regard to input/output further includes said second storage portion.

34. The input/output control method according to claim 29, wherein said information with regard to input/output further includes said second storage portion.

35. A non-transitory computer readable medium in which a computer-readable program code is stored for realizing an input/output control method of an information processing apparatus that includes a first storage portion and a second storage portion and carries out an input/output processing using a part of said first storage portion as a cache area, said input/output control method comprising:
  storing data, which is inputted from or outputted to said second storage portion, in said cache area;
  correlating a data area for said data stored in said cache area, and information with regard to said input/output to store them in an input/output specification information storage unit;
  generating an output request of said data from said data area in said cache area to said second storage portion; and
  specifying said information with regard to said input/output correlated to said data area of said data which is a target for said generated output request, by referring to said input/output specification information storage unit, and transmits information with regard to input/output which cannot be specified due to said step of generating said output request to a step of input/output processing in said second storage portion,
  wherein said information with regard to input/output includes at least one of information specifying an issuing source of said input/output, and priority of said input/output which corresponds to said issuing source.

36. The non-transitory computer readable medium according to claim 35, wherein said step of transmitting information with regard to input/output which cannot be specified due to said step of generating said output request to a step of input/output processing in said second storage portion, includes:
  restoring said information with regard to input/output which cannot be specified due to said step of generating said output request, by referring to said input/output specification information storage unit, based on said data area, in response to said output request.

37. The non-transitory computer readable medium according to claim 35, further comprising:
  generating an input/output processing process in charge of issuing an input/output request for a process; and
  correlating said process and said input/output processing process and managing said process and said input/output processing process,
  wherein said specifying step of transmitting information with regard to input/output which cannot be specified due to said step of generating said output request to a step of input/output processing in said second storage portion, includes:
  selecting said input/output processing process corresponding to said process and said information with regard to input/output by referring to said input/output specification information storage unit and information of said input/output processing process managing, based on said data area, in response to said output request, and
  said selected input/output processing process issuing said output request.

* * * * *